(12) United States Patent
Adler

(10) Patent No.: US 11,699,123 B2
(45) Date of Patent: Jul. 11, 2023

(54) SYSTEMS AND METHODS FOR CHARACTERIZING SUBSTANCE TRANSFER STATIONS

(71) Applicant: SOURCEWATER, INC., Houston, TX (US)

(72) Inventor: Joshua Adler, Houston, TX (US)

(*) Notice: Subject to any disclaimer, the term of this patent is extended or adjusted under 35 U.S.C. 154(b) by 0 days.

(21) Appl. No.: 16/541,543

(22) Filed: Aug. 15, 2019

(65) Prior Publication Data
US 2021/0049545 A1 Feb. 18, 2021

(51) Int. Cl.
G06Q 10/08 (2023.01)
E21B 43/26 (2006.01)
G06Q 30/02 (2023.01)
G06Q 10/0832 (2023.01)
G06Q 30/0283 (2023.01)

(52) U.S. Cl.
CPC ......... *G06Q 10/0832* (2013.01); *E21B 43/26* (2013.01); *G06Q 30/0284* (2013.01)

(58) Field of Classification Search
CPC ........... G06Q 10/0832; G06Q 30/0284; G06Q 10/0833; E21B 43/26; E21B 43/00; E21B 41/005
USPC ........................................................ 705/332
See application file for complete search history.

(56) References Cited

U.S. PATENT DOCUMENTS

| | | | | |
|---|---|---|---|---|
| 7,769,596 B1* | 8/2010 | Nair | ...... | G06Q 30/02 705/1.1 |
| 2013/0070636 A1* | 3/2013 | Farley | ...... | H04W 4/38 370/254 |
| 2014/0195453 A1* | 7/2014 | Richie | ...... | G06Q 10/0832 705/332 |
| 2014/0310041 A1* | 10/2014 | Crocker | ...... | G06Q 10/063114 705/7.15 |
| 2016/0180475 A1* | 6/2016 | Phillips | ...... | G01F 23/00 705/7.13 |
| 2017/0148313 A1* | 5/2017 | Zografos | ...... | G06Q 10/06312 |
| 2017/0186109 A1* | 6/2017 | Phillips | ...... | G06Q 10/0631 |
| 2018/0012154 A1* | 1/2018 | Melton | ...... | G06Q 10/047 |
| 2018/0315319 A1* | 11/2018 | Spector | ...... | G06Q 50/28 |
| 2020/0265370 A1* | 8/2020 | Peay | ...... | G06Q 10/08355 |

FOREIGN PATENT DOCUMENTS

DE  D E-102014216054 A1 * 2/2016 ............. G06Q 10/04

OTHER PUBLICATIONS

Easton, Jeff; WesTech; "Optimizing Water Management in Hydraulic Fracturing for Shale Oil and Gas Production"; Mar. 7, 2016. (Year: 2016).*

* cited by examiner

*Primary Examiner* — Resha Desai
*Assistant Examiner* — Dione N. Simpson
(74) *Attorney, Agent, or Firm* — Medler Ferro Woodhouse & Mills

(57) ABSTRACT

Systems and methods are described for detecting and determining information regarding substance transfer stations and for providing the information to users of an online platform in order to permit the users to make informed choices regarding which station to visit for vehicular loading or unloading of a carried substance. The systems and methods may be suitable for detecting and determining information regarding saltwater disposal stations in an oilfield region.

11 Claims, 14 Drawing Sheets

SYSTEMS AND METHODS FOR CHARACTERIZING SUBSTANCE TRANSFER STATIONS

TECHNICAL FIELD

The present invention generally relates to systems and methods for detecting and determining information about substance transfer stations. Applications of the present invention may include detecting and determining information about saltwater disposal stations in an oilfield region.

BACKGROUND

Hydraulic fracturing, or fracking, is the process of injecting a hydraulic liquid such as water or gel into shale rock under pressure in order to create or expand cracks to facilitate the extraction of subterranean natural gas and oil. Use of this technique has grown rapidly in recent years.

Water is not only needed to initiate the fracturing process (the injectate), but may also often be recovered, produced or released as part of the operation. This waste water may be a return of the injected water (known as 'flowback' water) or may be previously-trapped underground water that is released as a result of the fracturing (known as 'produced' water). In either case, the waste water typically has a high salt content, hence is commonly termed 'saltwater'. The quantity of returned saltwater can often be large, for example, exceeding by far the quantity of oil obtained from the well. The nature of the fracturing process therefore brings about a requirement not only to source large amounts of water at the outset of a project, but also to dispose-of or treat and recycle water during the project or upon its completion.

In support of this need for efficient water management in the energy industry, tools to facilitate a dynamic online platform for water sourcing, recycling and disposal may be employed in which buyers and sellers of water source or disposal capacity may advertise or exchange information related to either an availability-of or a requirement-for water, including a number of relevant attributes such as its quantity, location, type, and quality. Such a platform may address not only the water resource needs associated with oilfield exploration and development, but also the need and supply of other associated oilfield resources, services, or infrastructure.

Users of the online platform may span a number of different job functions related to the oilfield energy industry, including for example, employees of oilfield operators, construction contractors, and suppliers of resources, equipment or services. Many of these users may be involved in field work or field visits to well sites or processing facilities. Mobile applications running on a mobile device such as a smartphone or other suitable computing platform such as a tablet, laptop or in-vehicle automotive system may communicate with an online platform to allow a database of known oilfield sites to be searched and displayed for example visually on map. The mobile application may also display additional information regarding the oilfield sites to the user, such as the aforementioned availability-of or need-for oilfield water or other resources, materials or services.

Online platforms may also be enhanced to provide navigational information and services such that personnel may efficiently locate oilfield sites. In the case that a user's mobile device is location-enabled (for example incorporates a Global Positioning System—GPS—or other suitable location system receiver) an application within the mobile device may support the navigational or location-based services and guide users to a particular oilfield site of interest. The mobile application may also send information regarding the location of the mobile device to the online platform where it may be used for example by oilfield operators to locate their employees.

Within the oil and gas industry, waste water from oilfield operations is often transported by truck or by pipeline from the drilling or well site (where it is produced), to a saltwater disposal station. Some saltwater disposal stations may accept water via pipeline only, via truck only, or via a mix of both pipeline and truck. Saltwater is potentially hazardous to the environment and must also not contaminate fresh or drinking water supplies, hence care is needed for its safe disposal. A saltwater disposal station accepting water by truck typically comprises a number of truck offload or 'hook-up' points at which trucks may connect to the station via a hose or pipeline. The waste water is pumped from the truck into the station (or is alternatively received by pipeline), where it may be initially held in storage or transfer tanks (often referred to as a tank battery) before final disposal. Disposal is made into a disposal well that is located deep underground in order to avoid contamination of fresh water at shallower subterranean depths. The storage or transfer tanks may be used either to regulate the flow of water into the disposal well, or to allow for final processing or treatment of the water (such as skim-oil recovery) beforehand. Saltwater disposal stations may also process the waste water for recycling, thereby reducing the overall amount that is placed into the underground disposal well. In other examples, some disposal stations may not comprise storage or transfer tanks of their own or may not perform any processing or treatment of the saltwater local to the station. Instead, such stations may simply provide for connection to a pipeline network for the onwards transportation of the waste water to another disposal or processing facility.

Due to the need for careful handling, the disposal of saltwater waste is often subject to regulation and is performed by disposal companies specialized in this field and which have met the necessary approvals. Transportation of waste water from its source to a disposal station may be performed by a trucking or transportation company, or by a pipeline operator. Thus, there are at least three types of commercial entities involved in the disposal of waste water in oilfield regions: i) oilfield operators producing the water as a byproduct of their operations, ii) transportation companies who transfer the water to disposal stations and iii) disposal companies who ultimately receive and dispose of the waste water. In some cases, commercial entities may exist in which these functions are 'vertically integrated' into a single controlling entity. For example, an oilfield operator may run its own disposal facility, or a disposal company may run its own water transportation service. In other cases, these three different types of entity may exist and operate independently. In yet further cases, the entities may be independent but have close commercial ties or contracts in place that reduce the set of customers or suppliers that they commonly do business with.

Significant costs can be associated with saltwater disposal, therefore companies with a demand for the service (for example, oilfield operators or the transportation companies that they employ) wish to identify disposal options that minimize such costs. Conversely, providers of the disposal service (disposal companies) wish to attract the business of oilfield operators and trucking companies.

Saltwater disposal costs may be mitigated by identifying and selecting water source, disposal or treatment options that are geographically local to the well or fracturing site. However, transportation is only one of the contributory costs associated with saltwater disposal. Other costs arise due to disposal fees that may vary at different stations, and due to the time that may be needed to wait in-line at a busy or occupied disposal station before the offload of the water can commence. Such waiting times and disposal costs may in-turn be a function of variable customer demand or may be a function of variable saltwater disposal capacity available at a disposal station.

In light of the foregoing, there is therefore a need for systems and methods to detect and determine information related to saltwater disposal stations and to provide such information to users of an online platform in order to facilitate selection of a station, for example, one at which costs or time may be minimized, or one with sufficient capacity to accept a given volume or type of water. It would also be advantageous for such systems and methods to be compatible with the online platforms and mobile applications used for oilfield water management and associated location based services.

Whilst the systems and methods within this disclosure are described primarily in the context of selecting a disposal station for the transfer of oilfield waste water, they may be applied more-generally to the transfer of other goods or substances at a transfer station. For example, the systems and methods may also apply to 'midstream' oil and gas, wherein the driver of a truck originating from a well site may select a station for offload of the oil or gas into a pipeline network for its onward transportation to a processing facility. In further examples, the systems and methods may apply to the selection of a station for the transfer or offload of any (oilfield or non-oilfield) substance from a transportation vehicle.

SUMMARY

In a first example, a method is described for determining information regarding a substance transfer station for vehicular loading or unloading of a carried substance, the method comprising receiving location information from a first client device; determining, based on the received location information, that the first client device is located within a predefined region surrounding at least a portion of a substance transfer station; measuring a station time, the station time based on a contiguous time period during which the first client device is located within the predefined region; and transmitting station information to a second client device, the station information based on the measured station time.

In a second example, a method is described for characterizing conditions at a substance transfer station for vehicular loading or unloading of a carried substance, the method comprising establishing an ad hoc sensor network including one or more sensors; receiving location information from the one or more sensors; determining, based on the received location information, that a first sensor of the one or more sensors is located within a predefined region surrounding at least a portion of a substance transfer station; measuring a station time, the station time based on a contiguous time period during which the first sensor is located within the predefined region; and transmitting station information to a client device, the station information based on the measured station time.

In a third example, a method is described for identifying a substance transfer station for vehicular loading or unloading of a carried substance, the method comprising transmitting, by a client device, location information to a server of an online platform; receiving, by the client device and from a server of the online platform, a plurality of station information, each of the plurality of station information associated with one of a respective plurality of candidate substance transfer stations; identifying, based on the plurality of station information, an optimum substance transfer station associated with the lowest estimated time or cost of substance transfer amongst the plurality of candidate substance transfer stations; wherein the estimated time or cost of substance transfer associated with the optimum substance transfer station is based on the transmitted location information.

In a fourth example, a method is described for determining information regarding a substance transfer station for vehicular loading or unloading of a carried substance, the method comprising establishing a connection between a client device and one or more servers; receiving, by the client device and from one or more servers via the connection, a database of known substance transfer stations, a database of known road networks and information related to a condition at a first substance transfer station; determining, by the client device and when the connection is not established, a current location of the client device; determining, by the client device and when the connection is not established, a route of a journey from the current location of the client device to a location of the first substance transfer station; determining, by the client device and when the connection is not established, a time or a cost of substance transfer at the first substance transfer station based on the route of the journey and the condition at the first substance transfer station.

Other aspects and advantages of the invention will become apparent from the following detailed description, taken in conjunction with the accompanying drawings, which illustrate by way of example the principles of the invention.

DETAILED DESCRIPTION

Figure 1A:
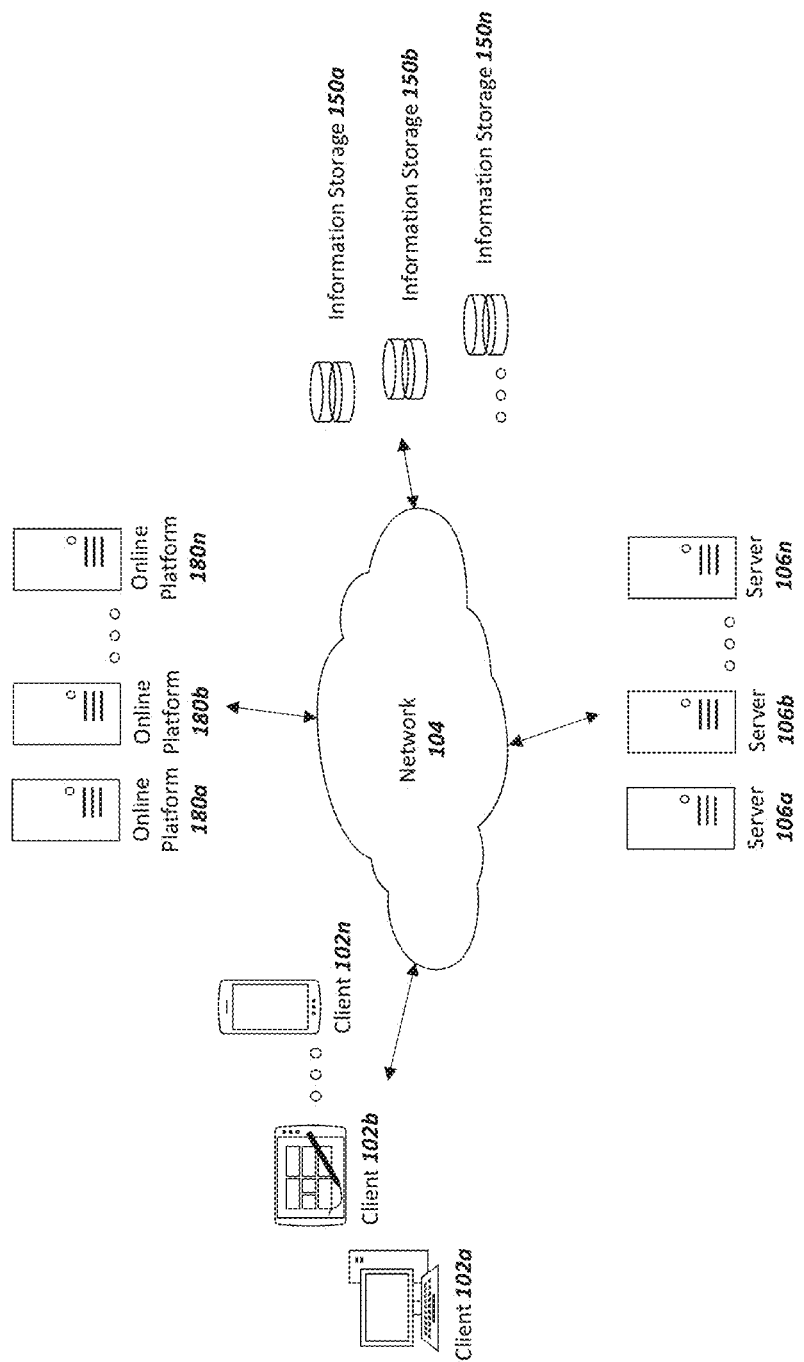
FIG. 1A is a block diagram depicting an embodiment of a network environment comprising client devices in communication with online platform devices, information storage devices, and server devices, according to some embodiments.

Financial costs associated with the disposal of oilfield saltwater arise due to a number of contributory factors. First, the waste water must be transported from the place at which it originates (such as a drilling or well site) to the place at which it is to be offloaded, either for treatment, onward transportation via pipeline, or disposal. Water may be carried to disposal stations by pipeline or by truck. The carriage of water by pipeline incurs costs associated with construction or use of a pipeline network whilst the carriage of water by truck incurs costs due to use of the vehicle (for example, vehicle value depreciation, fuel, servicing and maintenance) and due to the necessary driver labor time. Second, the disposal service itself carries a fee. This may be based on an amount per unit of volume (such as per-barrel) and may also vary as a function of the type, quality or make-up of the water to be disposed of. For example, some types of returned oilfield water may contain large quantities of either 'slickwater' or 'gel' (the different types of injectate mixtures of water, gel, chemicals or proppant that are used to alter various properties of the fluid), and hence may be harder to process or dispose of than produced saltwater that does not contain such gels, chemicals or proppant. As an illustrative case, returned water with a high concentration of gel-based injectate may have higher viscosity that ultimately leads to lower flow rates when injected at a given pressure 'downhole' into a disposal wellbore or injection formation.

Disposal stations are built in response to a business demand for saltwater disposal. Whilst these can accommodate an overall average demand, there may often be shorter-term fluctuations in immediate demand. In general, the arrival of a truck at a saltwater disposal station may be modelled or characterized as an event occurring with a certain probability during a defined time interval (for example, a minute). This is known as a Poisson arrival process. The arrival probability may in-turn be a function of other variables such as a time of day, or day of the week. For example, demand may tend to increase on weekdays, and reduce at weekends, or may increase mid-morning and reduce at sunset.

The number of trucks arriving at a station during a number of such time intervals (for example 60 one-minute intervals or an hour) is then also a random variable that may continue to exhibit substantial variance. For higher system loads, this variation in immediate demand leads to situations in which there may be no hook-ups available at a station and truck drivers need to wait in-line before being able to offload their water.

Within this disclosure, such a situation in which a vehicle is not able to immediately commence offloading on arrival at a transfer (or disposal) station is termed 'offload blocking'.

Offload blocking occurs whenever immediate demand exceeds the immediate capacity of disposal. Thus, blocking arises not only when there is a short-term peak in demand, but also when capacity at a station is temporarily restricted or reduced.

Saltwater disposal often involves storing of the water in a tank battery or any other temporary repository such as a pit (for example for pre-disposal treatment or processing) prior to its injection under pressure 'downhole' into a wellbore or injection formation. This gives rise to further potential disposal 'bottlenecks' (i.e. in addition to the number of available hook-ups) that also affect the immediate disposal capacity at a station. Firstly, the tank battery or storage tanks have finite volume, hence when these become full (for example due to the time necessary to process or treat the water, or due to limited outflow downhole into the wellbore), the station may no longer be able to accept any water for disposal until the situation is cleared. Flow downhole into the wellbore or injection formation may be limited either due to practical constraints (that is, there is only so much water of a particular type or viscosity that the injection formation can accept per hour, or that a pump can deliver at a given pumped pressure or pump power) or due to regulatory or permit-based constraints which may be imposed to reduce risk to the environment or to reduce a risk of causing seismic activity. Regulatory constraints include daily injection volume limitations and pressure limitations. Such regulatory constraints may be relatively static (for example imposed at the time a disposal permit is awarded) or may be dynamic in response to certain events. As an illustrative example of dynamic regulation, a regulator may limit or even stop the disposal of water at one or more stations in response to detecting an increase in seismic events within a geographical region.

Another factor that affects the disposal's immediate capacity to take water from other sources is the presence of any pre-committed or contractual capacity obligations that are agreed in-advance with an operator. Such obligations may necessitate that a disposal company or station reserves a certain capacity or volume for the operator regardless of whether the operator actually uses it. Furthermore, for saltwater disposal stations that accept water via both pipeline and via truck, the aggregate of these two inflow streams must be managed by the disposal company. Flows of water arriving at disposal stations by pipeline may be highly erratic and unpredictable. They may occur for a number of reasons such as when drilling has commenced, when drilling has reached a certain stage, or simply when a valve is opened by an oilfield worker to allow water stored in tanks at a producing wellsite to flow into the pipeline network towards the disposal station. Disposal companies may not receive any advance warning of these events.

The existence of commercial agreements or binding contracts with oilfield operators that commit a disposal company to provide a predetermined disposal capacity may further complicate this lack of predictability. Even though the arrival of water for disposal by pipeline is highly variable and unpredictable, such contracts may expose the disposal company to significant financial penalties or damages if sufficient disposal capacity is not provided. Hence, to mitigate against these financial penalties, a disposal company may preferentially assign any available capacity to water arriving by pipeline, and thereby deprioritize the capacity available for water arriving by truck. It shall be appreciated therefore that a sudden influx of pipeline water at a disposal station may necessitate a temporary closure of one or more hook-ups at the station for truck-based water disposal. This type of pipeline surge is therefore also a further potential cause of disposal blocking and wait times at stations.

The nature of the disposal method (via holes drilled deep into the ground) also leads to a distributed capacity of disposal. That is, there may be physical, practical or imposed (regulated) limits on the aggregate volume or rate of water disposal that is possible at a given disposal site or within a given land area. Thus, it is more common for there to be multiple distributed (and smaller) disposal stations, than just a few very large ones. This gives greater freedom to truck drivers in that they have a larger number of disposal stations from which to select. However, it can be shown via queuing theory that distributing a total number "N" of hook-ups across multiple disposal stations (for example, N/2 at each of two stations) actually leads to a larger probability of offload blocking when compared to "N" hook-ups located at a single station. This is because a disposal station is typically pre-selected by the driver before making the journey, thus there is a degree of lost opportunity for statistical multiplexing in the distributed case. Therefore, for a given system load, the prevalence of small and distributed disposal stations (versus fewer centralized ones) can increase the likelihood that a driver will have to wait before offloading water.

It is apparent from the above that unless the collective capacity of disposal stations in a geographical region far exceeds the demand within that same geographical region, some degree of offload blocking will occur, and therefore average wait times at each station will be non-zero.

Transfer and disposal stations may not include the hardware and infrastructure requirements, such as sensors, cameras, communication devices, etc., to measure, characterize or communicate station conditions such as wait times to potential customers. Customers of the station, however, frequently carry mobile devices (or travel in vehicles fitted with mobile devices such as GPS tracking devices) that include data gathering capabilities. In an aspect of the present disclosure, a substance transfer station information system may engage one or more mobile devices to gather information on conditions at a substance transfer station. The systems may engage mobile devices on an ad hoc basis, conscripting devices present at a transfer station location to gather data useful for characterizing conditions at the transfer station. The systems may then analyze and integrate the various collected data from the engaged mobile devices to characterize station conditions, such as waiting times, capacity, remaining capacity, offload times, etc., as station information. The system may further communicate the determined conditions to other system users. Thus, in some examples, the system operates to form ad hoc sensor networks to collect data from mobile or remote devices, to process the collected data to form station information and to provide the station information to system users. Ad hoc sensor networks may comprise a server and one or more remote sensors to which temporary connections have been established and from which, one or more pieces of sensed information may be received. Connections between the server and a sensor may be direct or may be relayed by an intermediary mobile or remote device.

Whilst at a disposal station, each truck must occupy a hook-up for a period of time whilst the water is offloaded, this being a function of the volume of water brought by the truck to the station and the pumped flowrate. A truck may also remain at the station for a period of 'overhead' time that does not include the time waiting to offload or the time whilst actively offloading. For example, a truck driver may first wait in-line to offload water, then offload, then take a break after offloading prior to leaving the station for another trip.

The time ($T_{station}$) that a truck is located at a transfer (or disposal) station may therefore be represented as a sum of contributory time periods, for example as follows:

$$T_{station} = T_{wait} + T_{offload} + T_{overhead}$$

In one aspect of the present disclosure, information regarding the station time ($T_{station}$) or one or more of its constituent components ($T_{wait}$, $T_{offload}$, $T_{overhead}$) may be collected by an online platform configured to receive data from one or more mobile or remote devices and used to provide "station information" characterizing the conditions at a transfer or disposal station to a user of the online platform so that the user may take the station information into account when selecting a transfer (or disposal) station to use.

In another aspect of the present disclosure, information regarding an estimated or actual remaining disposal capacity may be collected by an online platform configured to receive data from one or more mobile or remote devices and used to provide "station information" to a user of the online platform in order that the user may take the station information into account when selecting a transfer (or disposal) station to use.

The station information may take various forms. In one example, the station information may comprise a current or average time value derived from the collected information. For example, the station information may be based on an average value of $T_{station}$ at that station during a preceding three-hour period (or any other length period). In further examples, the station information may also be based on a journey time from a starting location (such as a current location) of the user to the station, thereby providing an estimated total trip time inclusive of at least a journey time, a wait time and an offload time. In other examples of the present disclosure, the station information may comprise a determined total cost to transfer the substance. For example, the station information may be an estimated saltwater disposal cost comprised of a journey cost from a current location of the user to the disposal station, a labor cost whilst waiting or offloading at the station, and a disposal fee at the station. In further examples, the station information may include an estimated or actual disposal capacity remaining at a station. In yet further examples of the present disclosure, the online platform may collect and analyze location information and/or user feedback information provided by user devices in order to determine the station information that is subsequently provided to the online platform users. Further details may be found in the accompanying figures and descriptions thereof.

The disclosures herein offer technical solutions that detect and determine information regarding substance transfer stations via the use and integration of multiple information sources, including but not limited to mobile devices, databases, storages and servers. By providing the detected and determined substance transfer station information to users of the online platform, this permits such users to make better-informed choices regarding which substance transfer station to use, for example to minimize a time or a cost associated with a substance transfer or to ensure that a station is selected that has available capacity before making a journey. Additionally, by providing users of the online platform with 'live wait-time' information and/or 'live disposal capacity' information, the technical solutions may also result in increased overall system capacity and efficiency, reduced waiting times and improved customer satisfaction levels by distributing demand for substance transfer services more-evenly across stations. Advantageously, the technical solutions may facilitate such capacity and efficiency improvements without the need for centralized control to allocate trucks to particular disposal stations. Instead, the systems and methods determine and provide the station information necessary for the users themselves to make better-informed decisions that lead to the capacity improvements. To enable this functionality, the systems and methods employ technical tools to assist the user's access to the station information.

The systems and methods described may extend the capabilities of an online platform (for example, a platform for oilfield water management, or a platform for oilfield navigation), by providing functionality, within a server or a mobile device, to facilitate the collection and analysis of location information from location-enabled user devices and to process the collected location information in order to determine station information and to provide the determined station information to a user.

In embodiments, the systems and methods are described in the context of their application to saltwater disposal in oilfield regions. However, these embodiments serve as illustrative examples only and do not otherwise limit the scope of the disclosure to such use cases.

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for detecting and determining information regarding a substance transfer station.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment may include one or more clients 102a-102n (also generally referred to as local machines(s) 102, client(s) 102, client node(s) 102, client machine(s) 102, client computer(s) 102, client device(s) 102, mobile device(s) 102, remote device(s) 102, endpoint(s) 102, or endpoint node(s) 102) in communication with one or more servers 106a-106n (also generally referred to as server(s) 106, node(s) 106, machine(s) 106, or remote machine(s) 106), one or more online platforms 180a-180n (also generally referred to as online platforms(s) 180, platform node(s) 180, platform machine(s) 180, or remote online platform machine(s) 180), and one or more information storages 150a-150n (also generally referred to as information storage(s) 150, record node(s) 150, record machine(s) 150, or remote record machine(s) 150) via one or more networks 104. In some embodiments, one or more of client 102, online platform 180, or information storage 150 has the capacity to function as both a node seeking access to resources provided by a server and as a server providing access to hosted resources for other clients 102a-102n, online platforms 180a-180n, and information storages 150a-150n. Examples of client(s) 102 includes user(s) 190 and subscriber(s) 195.

Although FIG. 1A shows a network 104 between clients 102, online platforms 180, information storage 150, and the servers 106, in examples clients 102, online platforms 180, information storage 150 and servers 106 may be on the same network 104. In some embodiments, there are multiple networks 104 between clients 102, online platforms 180, information storage 150 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks. Servers 106 may be used to generically refer to all of online platforms 180, information storage 150 and servers 106. Clients 102, online platforms 180, and information storage 150 may process input from server 106 and/or may provide access as needed to various applications, modules, and other software components of server 106 to other various applications, modules, and other software components of server 106.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 104 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 104 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106, online platform 180 and information storage 150 may be a file server, application server, web server, proxy server, appliance, network appliance, gateway, gateway server, virtualization server, deployment server, SSL VPN server, or firewall. In one embodiment, a plurality of servers 106, online platforms 180 and information storages 150 may be in the path between any two communicating servers 106, online platforms 180 and information storages 150.

Figure 1B:
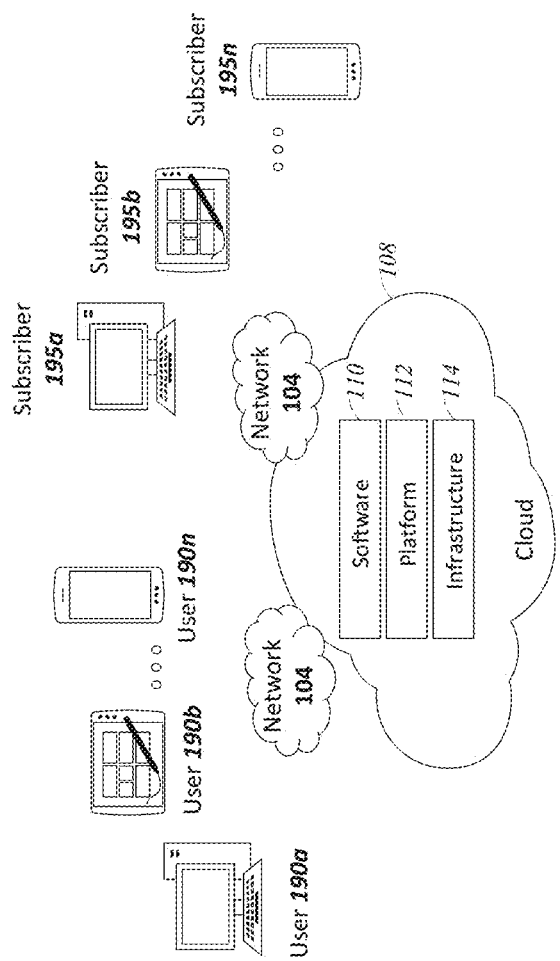
FIG. 1B is a block diagram depicting a cloud computing environment comprising client devices, for example user device and subscriber device, in communication with cloud service providers, according to some embodiments.

Referring to FIG. 1B, a cloud computing environment is depicted. A cloud computing environment may provide user 190 and subscriber 195 with one or more resources provided by a network environment. The cloud computing environment may include one or more users 190a-190n and one or more subscribers 195a-195n in communication with the cloud 108 over one or more networks 104. Users 190 and subscribers 195 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for user 190 or subscriber 195. The cloud 108 may include back end platforms, e.g., servers 106, storage, server farms or data centers.

The cloud 108 may be public, private, or hybrid. Public clouds may include public servers 106 that are maintained by third parties to client(s) 102, for example user(s) 190 and subscriber(s) 195 or owners of client(s) 102, user(s) 190, and/or subscriber(s) 195. The servers 106 may be located off-site in remote geographical locations as disclosed above or otherwise. Public clouds may be connected to the servers 106 over a public network. Private clouds may include private servers 106 that are physically maintained by client(s) 102, for example user(s) 190 and/or subscriber(s) 195 or owners of client(s) 102, user(s) 190, and/or subscriber(s) 195. Private clouds may be connected to the servers 106 over a private network 104. Hybrid clouds may include both private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources.

Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g., Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Client(s) 102, for example user(s) 190 and/or subscriber(s) 195 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Client(s) 102, for example user(s) 190 and/or subscriber(s) 195 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client(s) 102, for example user(s) 190 and/or subscriber(s) 195 may access SaaS resources through the use of web-based user interfaces, provided by a web browser (e.g., Google Chrome, Microsoft Internet Explorer, or Mozilla Firefox provided by Mozilla Foundation of Mountain View, Calif.). Client(s) 102, for example user(s) 190 and/or subscriber(s) 195 may also access SaaS resources through smartphone or tablet applications, including e.g., Salesforce Sales Cloud, or Google Drive App. Client(s) 102, for example user(s) 190 and/or subscriber(s) 195 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client(s) 102, for example user(s) 190 and/or subscriber(s) 195 and server 106 may be deployed as and/or executed on any type and form of computing device, e.g., a computer, network device or appliance capable of communicating on any type and form of network and performing the operations described herein.

Figure 1C:
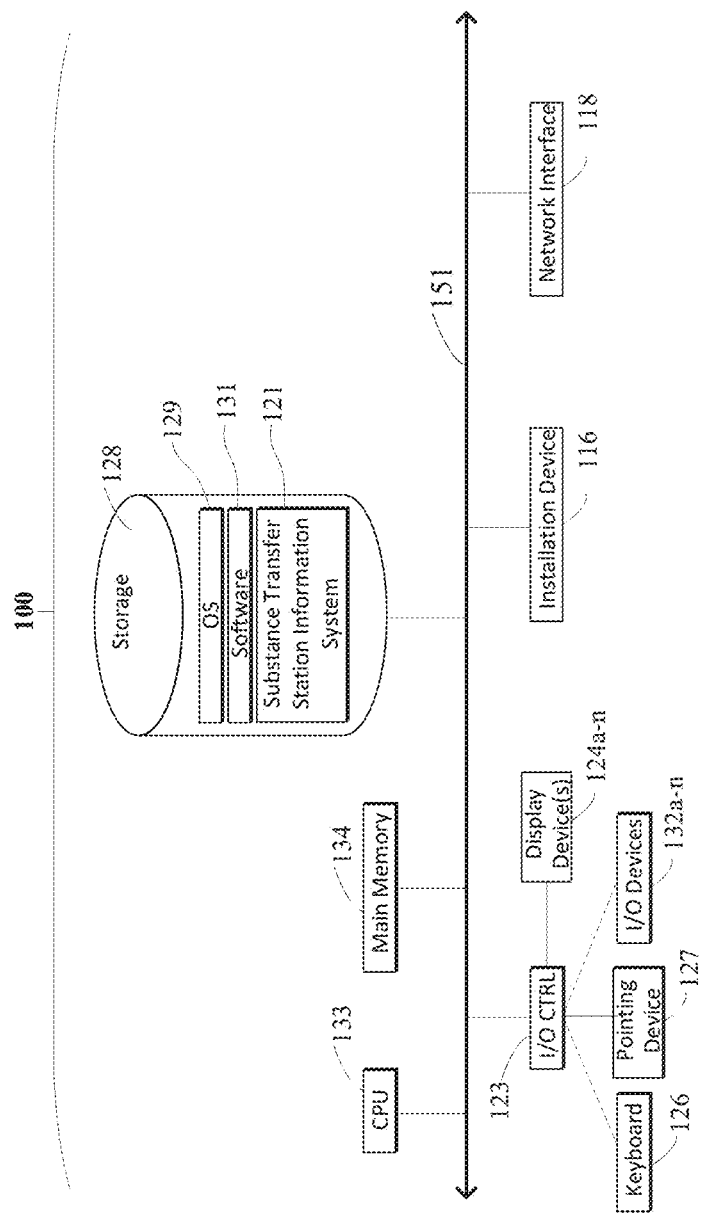
FIG. 1C and FIG. 1D are block diagrams depicting embodiments of computing devices useful in connection with the methods and systems described herein.
Figure 1D:
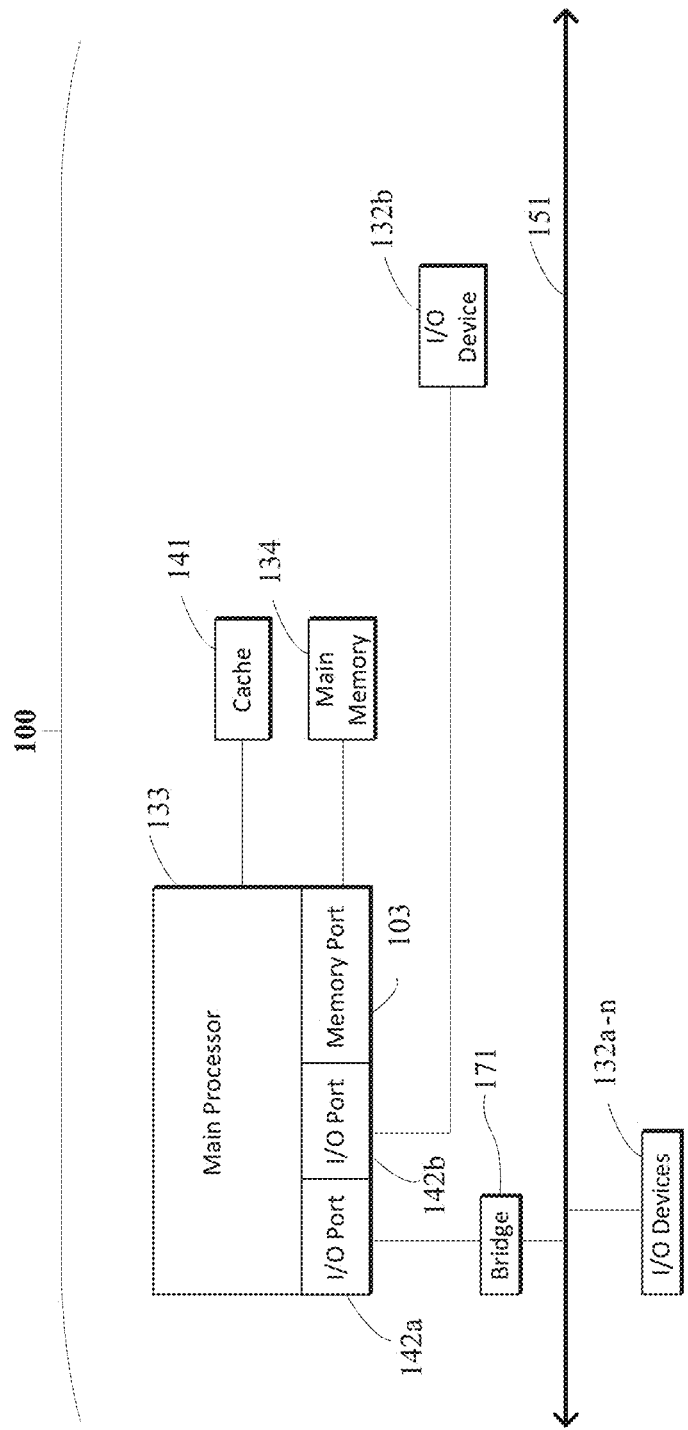

FIGS. 1C and 1D depict block diagrams of a computing device 100 useful for practicing an embodiment of the client 102, online platform 180, information storage 150 and the server 106. As shown in FIGS. 1C and 1D, each computing device 100 includes a central processing unit 133, and a main memory unit 134. As shown in FIG. 1C, a computing device 100 may include a storage device 128, an installation device 116, a network interface 118, an I/O controller 123, display devices 124a-124n, a keyboard 126 and a pointing device 127, e.g., a mouse. The storage device 128 may include, without limitation, an operating system 129, software 131, and a software of a substance transfer station information system 121. As shown in FIG. 1D, each computing device 100 may also include additional optional elements, e.g., a memory port 103, a bridge 171, one or more input/output devices 132a-132n (generally referred to using reference numeral 132), and a cache memory 141 in communication with the central processing unit 133.

The central processing unit 133 is any logic circuity that responds to and processes instructions fetched from the main memory unit 134. In many embodiments, the central processing unit 133 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER4 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 133 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i4.

Main memory unit 134 may include on or more memory chips capable of storing data and allowing any storage location to be directly accessed by the microprocessor 133. Main memory unit 134 may be volatile and faster than storage 128 memory. Main memory units 134 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 134 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 134 may be based on any of the above described memory chips, or any other available memory chips capable of operating as described herein. In the embodiment shown in FIG. 1C, the processor 133 communicates with main memory 134 via a system bus 151 (described in more detail below). FIG. 1D depicts an embodiment of a computing device 100 in which the processor communicates directly with main memory 134 via a memory port 103. For example, in FIG. 1D the main memory 134 may be DRDRAM.

FIG. 1D depicts an embodiment in which the main processor 133 communicates directly with cache memory 141 via a secondary bus, sometimes referred to as a backside bus. In other embodiments, the main processor 133 communicates with cache memory 141 using the system bus 151. Cache memory 141 typically has a faster response time than main memory 134 and is typically provided by SRAM, BSRAM, or EDRAM. In the embodiment shown in FIG. 1D, the processor 133 communicates with various I/O devices 132 via a local system bus 151. Various buses may be used to connect the central processing unit 133 to any of the I/O devices 132 including a PCI bus, a PCI-X bus, or a PCI-Express bus, or a NuBus. For embodiments in which the I/O device is a video display 124, the processor 133 may use an Advanced Graphic Port (AGP) to communicate with the display 124 or the I/O controller 123 for the display 124. FIG. 1D depicts an embodiment of a computer 100 in which the main processor 133 communicates directly with I/O device 132b or other processors 133' via HYPERTRANSPORT, RAPIDIO, or INFINIBAND communications technology. FIG. 1D also depicts an embodiment in which local busses and direct communication are mixed: the processor 133 communicates with I/O device 132a using a local interconnect bus while communicating with I/O device 132b directly.

A wide variety of I/O devices 132a-132n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 132a-132n may include a combination of multiple input or output (I/O) devices, including, e.g., Microsoft KINECT, Nintendo Wiimote for the WII, Nintendo WII U GAMEPAD, or Apple iPhone. Some I/O devices 132a-132n allow gesture recognition inputs through combining some of the inputs and outputs. Some I/O devices 132a-132n provide for facial recognition which may be utilized as an input for different purposes including authentication and other commands. Some I/O devices 132a-132n provide for voice recognition and inputs, including, e.g., Microsoft KINECT, SIRI for iPhone by Apple, Google Now or Google Voice Search, and Alexa by Amazon.

Additional I/O devices 132a-132n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 132a-132n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, an I/O device 132 may be a bridge between the system bus 151 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 132a-132n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the feature recognition system software 121. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 151. Some storage device 128 may be external and connect to the computing device 100 via an I/O device 132 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.1 1a/b/g/n/ac CDMA, GSM, WiMAX and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 4, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 340 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M9A/AAC, WMA Protected AAC, AIFF, Audible audiobook, Apple Lossless audio file formats and .mov, .m4v, and .mp4 MPEG-4 (H.244/MPEG-4 AVC) video file formats.

In some embodiments, the computing device 100 is a tablet e.g., the IPAD line of devices by Apple; GALAXY TAB family of devices by Samsung; or KINDLE FIRE, byAmazon.com, Inc. of Seattle, Wash. In other embodiments, the computing device 100 is an eBook reader, e.g., the KINDLE family of devices by Amazon.com, or NOOK family of devices by Barnes & Noble, Inc. of New York City, N.Y.

In some embodiments, client 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, client 102 is a laptop or desktop computer equipped with a web browser and a microphone and speaker system, e.g., a telephony headset. In these embodiments, the client(s) 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Main Description

The following describes systems and methods that are useful for detecting and determining information regarding a substance transfer station. Applications of the present invention may include detecting and determining information regarding a saltwater disposal station in an oilfield region. Details of the disclosed systems and methods are provided by means of the accompanying figures and description as follows.

Figure 2:
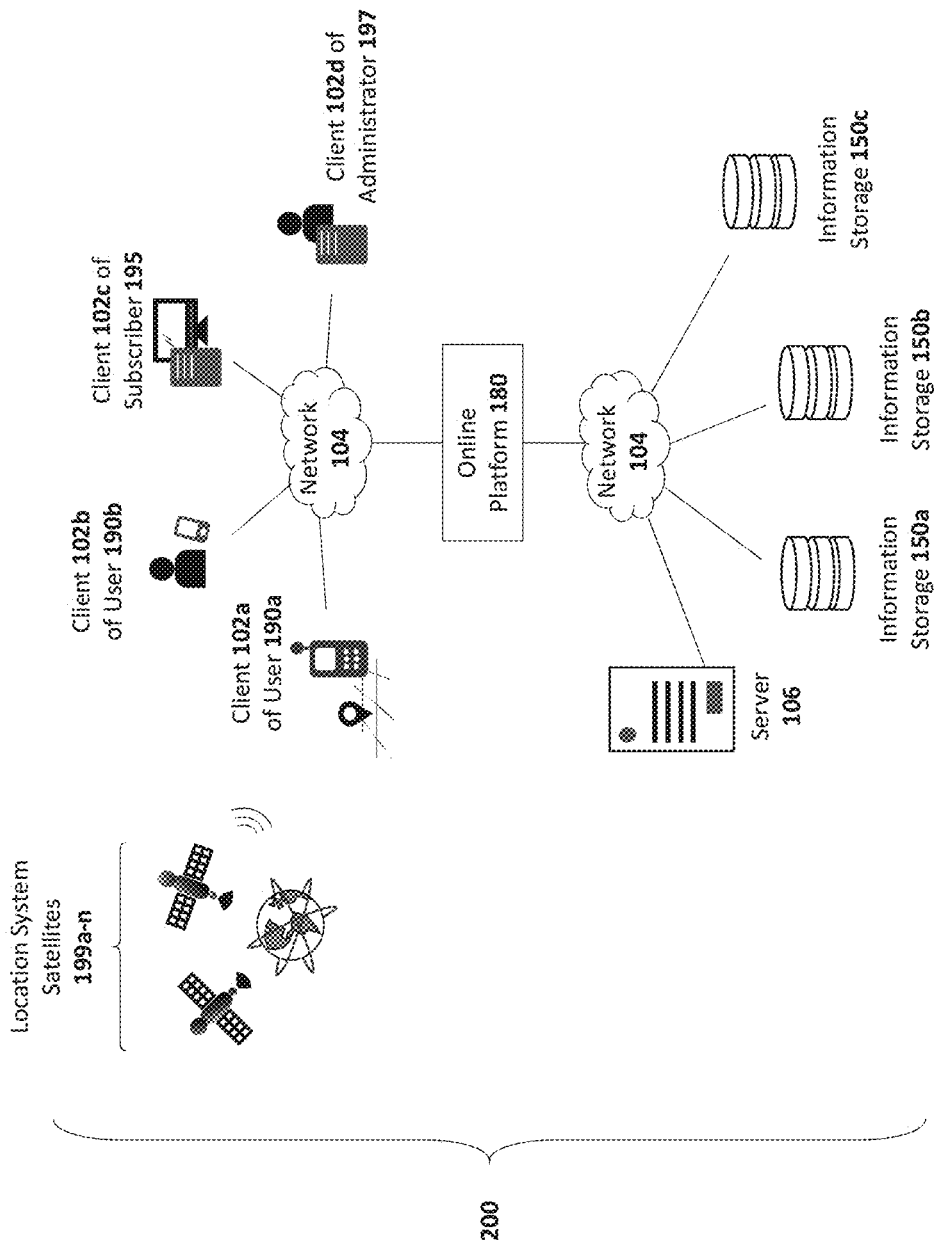
FIG. 2 shows a system suitable for detecting and determining substance transfer station information, according to some embodiments.

In a general overview, FIG. 2 shows a system 200 suitable for detecting and determining substance transfer station information, according to some embodiments Referring to FIG. 2 in more detail, system 200 may comprise one or more servers 106, one or more information storages 150a, 150b and 150c, one or more online platforms 180, one or more location system satellites 199a-n and one or more clients 102a, 102b, 102c and 102d operated by users 190a and 190b, subscribers 195 or administrators 197.

Any of server 106, information storages 150, online platform 180, location system satellites 199 and clients 102 of users 190, subscribers 195 and administrators 197 may be connected to one another. Depending on the application or environment, the connection may be achieved via wired or wireless means, and such a connection may be either direct or may traverse a network 104. For ease of illustration, example connections of FIG. 2 are shown traversing a network 104 though such a network need not be present and may be replaced with a direct connection or no connection at all.

Any of client devices 102a-n may be location enabled such that they are able to determine their own location using a suitable location technology. Suitable location technologies may include satellite-based technologies such as, but not limited to, the Global Positioning System (GPS), Globalnaya Navigatsionnaya Sputnikovaya Sistema or GLObal NAvigation Satellite System (GLONASS), Galileo, or BeiDou. Alternatively, terrestrial-based or cellular radio location technologies may be employed by client devices 102a-n. Clients 102 may be capable of reporting their current location, or a stored history of previous locations, to online platform 180 or server 106 via one or more networks 104. Clients 102 that are location enabled and which utilize a satellite-based location technology are capable of receiving radio signals transmitted by one or more location system satellites 199a-n and of processing the radio signals to determine a location of the client 102.

Online platform 180, server 106, or network 104 may also be capable of determining the location of a client 102, even if client 102 is not location enabled. In such cases, online platform 180, server 106 or network 104 may utilize a network address to resolve the location of, for example, a wired client 102, or may process received radiocommunication signals to resolve the location of, for example, a wireless client 102. The processing of the radiocommunication signals may be based on any suitable method, including, but not limited to, a time-of-arrival (ToA) based analysis or a Direction of Arrival (DoA) based analysis.

In examples, online platform 180 may comprise an oilfield water platform in which users 190 and subscribers 195 may advertise or exchange information related to an availability-of or need-for oilfield water or other associated oilfield resources, services, or infrastructure. Alternatively, or in combination, online platform 180 may comprise a navigation platform to assist oilfield workers (such as users 190 and subscribers 195 of the online platform) to route-to and locate oilfield sites, facilities and properties. Such purposes and uses of online platform 180 serve as illustrative examples only and do not limit application of the described systems and methods to other types of online platform 180.

Server 106 or online platform 180 may communicate with information storages 150a, 150b or 150c either directly, or via a network 104. Information may be written to or retrieved from any of information storages 150a, 150b and 150c. Information storages 150a-c may possess certain other attributes or characteristics. For example, any of information sources 150a-c may be privately or publicly owned or may be local or remote to server 106. Further example characteristics of information sources 150a-150c may be that the information they comprise is freely or publicly accessible or has restricted access for example only to users of a specific entity, or group. Yet further characteristics of information sources 150a-c may be that the information they comprise is available with or without a financial cost or subscription. It shall be appreciated that such characteristics are exemplars only hence do not limit the scope of the description and other equivalent or similar information sources may be equally suitable for use within system 200.

In examples, information storage 150a may comprise road mapping or navigational information such as road network data, or information pertaining to live traffic status such as average vehicle speeds on sections of highway, the locations of known hold-ups or areas of congestion and so forth.

In examples, information storage 150b may comprise information regarding the locations of known substance transfer stations (for example, saltwater disposal stations). In some embodiments, information storage 150b may also contain additional information regarding the known substance transfer stations, such as the commercial entities or companies that operate them, facilities available at a station or information on disposal capacity, disposal limits or other restrictions that may be in place.

In examples, information storage 150c may comprise configuration information such as that received from a user 190, subscriber 195, or administrator 197 of online platform 180. Such configuration information may enable such users 190, subscribers 195 or administrators 197 to control the functionality and behaviors of system 200. For example, configuration information held within information storage 150c may allow a user 190 to specify preferred disposal companies to use, to configure a labor rate or fuel cost to be used in calculations performed by the system, or to specify a type, quality or volume of saltwater to be disposed of.

Embodiments of system 200 may include functionality to determine information regarding substance transfer stations and to provide this information to a user 190 or subscriber 195, thereby assisting the user with a selection of a substance transfer station. Such functionality may comprise a station information processing manager 350 (for example located within server 106 or online platform 180) which may communicate with a client application component located within client 102.

In examples of system 200, the configuration and maintenance of server 106, online platform 180, information storages 150a-c or clients 102a-c may be controlled by administrator 197 who may access or control these either directly or via a network 104. Operations that may be performed by administrator 197 may include for example, the updating of software or firmware used by any component of the server 106, the clients 102, the online platform 180, the information storages 150 or the networks 104. Further administrative operations may include the configuring, receiving or processing of diagnostic reports or logs, the configuring of parameters, variables, or thresholds used by any component of the system, the reading or writing of data from storages and the configuring of networks.

Figure 3A:
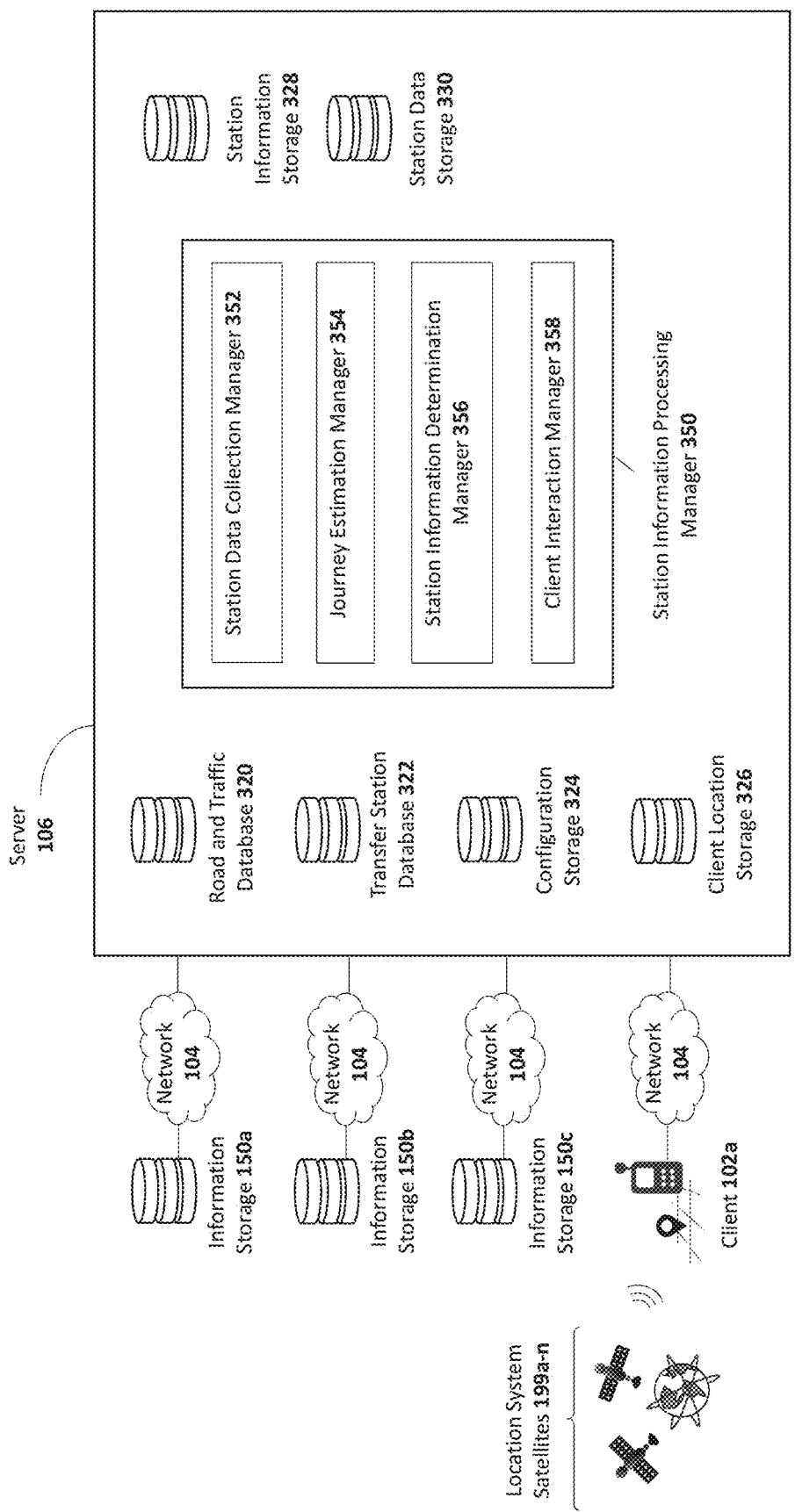
FIG. 3A shows a server in connection with other components of a substance transfer station information system, according to some embodiments.

FIG. 3A shows one example of a server 106 in connection with other components of a substance transfer station information system including information storages 150a-c, client 102a, and location system satellites 199a-n, according to some embodiments. Referring to FIG. 3A in more detail, server 106 may include a station information processing manager 350 in addition to internal storages such as road and traffic database 320, transfer station database 322, configuration storage 324, client location storage 326, station information storage 328 and station data storage 330. Internal storages 320, 322, 324, 326, 328 and 330 may facilitate the exchange and communication of information or data between components internal to or external to server 106. By means of example, road and traffic database 320 may facilitate local storage, within server 106, of road mapping or live traffic information, some, all or none of which may have been retrieved from information storage 150a. As further examples, transfer station database 322 may facilitate local storage of information relating to known disposal stations in a given geographical area, which (optionally) may in-turn have been sourced from an information storage 150b that lies external to server 106. In yet further examples, configuration storage 324 may facilitate local storage of configuration information that may have optionally been retrieved from information storage 150c, and client location storage 326 may provide local storage of location information transmitted to server 106 by a client 102a. In general, server 106 may be connected to any other external information storages, such as 150d, 150e, 150f, and so forth (not shown), these comprising any other information of use in facilitating the operation of station information processing manager 350.

Figure 3B:
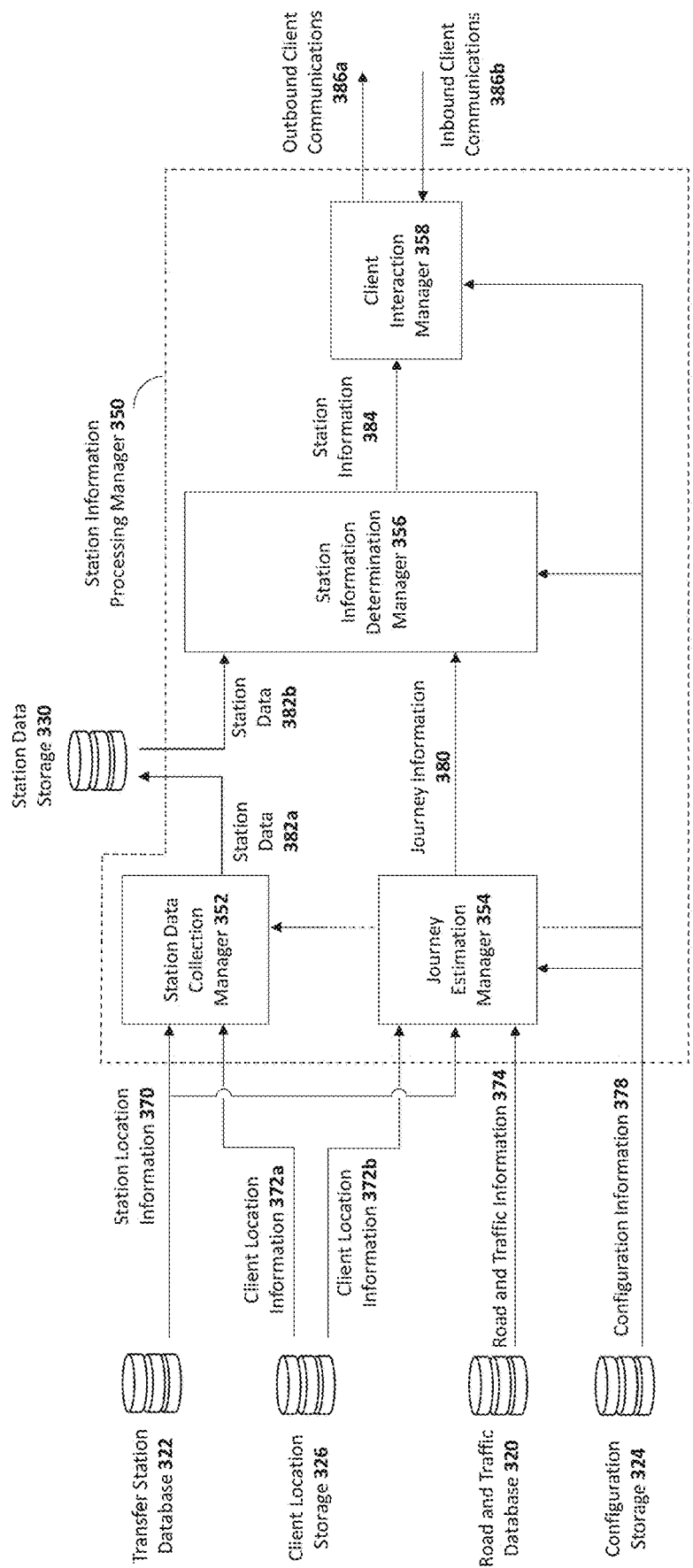
FIG. 3B illustrates an example configuration of a substance transfer station information system according to some embodiments.

In some examples, station information processing manager 350 may comprise additional constituent components, such as a station data collection manager 352, a journey estimation manager 354, a station information determination manager 356 and a client interaction manager 358, further detail of which may be found with reference to FIG. 3B and the accompanying description thereof. Referring again to FIG. 3A, server 106 may receive one or more informational inputs including, for example, road and traffic information (from information storage 150a), transfer station information (from information storage 150b), configuration information (from information storage 150c) and location information (from a location-enabled client 102a, or from a location-enabled network 104 to which client 102a is connected). These information inputs may optionally be stored locally within server 106, for example in internal storages 320, 322, 324, or 326 respectively. Whether stored locally or not, the informational inputs to server 106 may be subsequently provided to station information processing manager 350 for further processing.

In addition to receiving information from components of system 200 that are external to server 106, server 106 may also communicate or write information to such external components. By means of example, as a result of its operation, station information processing manager 350 of server 106 may determine updated information regarding waiting times at a substance transfer station, that may not only be written to internal station data storage 330 or to transfer station database 322, but which may also be communicated externally to information storage 150c, to a client 102 such as client 102a, to another server 106, or to an online platform 180.

FIG. 3B illustrates an example configuration of a server 106 of a substance transfer station information system 200 according to some embodiments. Server 106 may comprise a station information processing manager 350, which may in-turn comprise station data collection manager 352, a journey estimation manager 354, a station information determination manager 356 and a client interaction manager 358. Station information processing manager 350 may receive informational inputs such as station location information 370, client location information 372 (for example client location information 372a regarding the location of a user client 190a and client location information 372b regarding the location of a user client 190b), road and traffic information 374 and configuration information 378. In examples, the station location information 370, the client location information 372a/372b, the road and traffic information 374, and the configuration information 378 may be sourced from transfer station database 322, client location storage 326, road and traffic database 320 and configuration storage 324 respectively.

As a result of its operation, station information processing manager 350 may exchange outbound client communications 386a to, and inbound client communications 386b from, a client 102 of a user 190, subscriber 195 or administrator 197. In examples, such inbound and outbound client communications may be centrally processed and managed by a client interaction manager 358, though it shall be appreciated that any functional element of station information processing manager 350 may perform inbound or outbound communications 386*a* and 386*b* directly with a client (that is, without necessarily involving client interaction manager 358).

In examples, the outbound client communications 386*a* may comprise station information 384 which is usable by a user or subscriber to select a substance transfer station. The inbound client communications 386*b* may comprise client configuration or feedback information that is sent by the client 102 to the serer 106 and which may be usable by the server 106 to modify or control the functionality of the station information processing manager 350 or any component thereof. In examples, the client configuration or feedback information may contain user configurations or preferences for the system such as a volume, type or quality of water to disposed, a maximum distance or time that the driver is willing to accept for a trip to dispose of water, journey routing preferences, disposal company preferences or constraints and so forth. In further examples, the client configuration or feedback information may comprise information from the client 102 on a customer experience at a visited substance transfer station (such as a waiting time to dispose of water, the friendliness of staff, whether the station had available disposal capacity or what disposal services and options were available), facilities present at a station (such as whether food and washrooms are available), conditions experienced on a journey to a station (such as traffic congestion or a delay due to a road accident) or a current status of the user (such as whether the user is currently waiting in-line to dispose of water or at a station, travelling to a particular station, or queuing in traffic congestion).

The sending of the client configuration or feedback information within the inbound client communications 386*b* may either be initiated by the client 102 itself or may be in response to a client information request message sent by the server to the client 102 within outbound client communications 386*a*. Such a client information request may, for example, request from a user of client 102, user configuration or preferences for the system, user experiences of a visited station, conditions experienced on a journey or a current status of the user. The returned client configuration or feedback may be comprised within a client information response message, sent by the client 102 to the server 106.

Whilst not shown in FIG. 3B for reasons of diagrammatical clarity, client configuration or feedback information received by server 106 within inbound client communications 386*b* may be used to update any one or more storages accessible to server 106, such as transfer station database 322, road and traffic database 320, configuration storage 324, station data storage 330 or any other information storage such as information storages 150*a-c*. Client configuration or feedback information received by server 106 within inbound client communications 386*b* may also be passed to any component within station information processing manager 350 in order that the information contained therein may be taken into account during its operation.

In operation, station information processing manager 350 may receive, for example from client location storage 326, client location information 372*a* corresponding to a location or location history of a client 102*a*. Client location information 372*a* may comprise a plurality of recorded geographical locations (and corresponding timestamps) of client device 102*a*, for example, a series of locations defining a driven route or journey made by the client. The geographical locations comprised within client location information 372*a* may either represent a current or "live" location of the client, or a previously traveled history of locations of the client. In some examples, client location information 372*a* may comprise client location measurements made by the client and transmitted by the client to the server 106. In other examples, client information 372*a* may comprise client location measurements that are made by a network 104 to which the client is connected, and which are transmitted by the network 104 to the server 106.

As used herein, a server receiving a current or "live" location of the client refers to the server receiving the location information at substantially the same time as it is measured by the client. Thus, the client device measures location data, processes it appropriately, and transmits it to the server shortly after the measurement. It is understood that certain delays, such as processing delays and telecommunications delays, prevent the data from being received at the same time that is measured. Although the data may be stored, substantially the same time means that device operations intended to process and transmit the data to a server are not ceased entirely. In this context, substantially the same time may mean within 1 second, 5 seconds, 15 seconds, 30 seconds, 1 minute and up to 5 minutes.

Client location information 372*a* may be passed to a station data collection manager 352 which may also receive station location information 370, for example, from transfer station database 322. In examples, the station location information 370 may comprise the geographical coordinates of known substance transfer stations. Station data collection manager 352 may analyze client location information 372*a* in order to determine whether the client 102*a* has visited the locations of one of the known substance transfer stations (as comprised within station location information 370). In order to do so, station data collection manager 352 may define a logical 'geofence' or boundary enclosing a predefined region around a known substance transfer station and may determine whether a route traveled by client 102*a* has passed into the predefined region defined by the geofence. In examples, the geofence may be a small circular region with a predefined radius surrounding the location of the known substance transfer station, though in general any other boundary enclosing at least a portion of, abutting, and/or located in proximity to-, the substance transfer station may be defined, whether regular or irregular in shape.

Station data collection manager 352 may also determine a time of entry ($T_{entry}$) into the geofence region (for example corresponding to an arrival time of a truck at a water disposal station) and/or a time of exit ($T_{exit}$) from the geofence region (for example corresponding to a departure time of a truck from a water disposal station).

In some examples, station data collection manager 352 may further determine a difference between the entry time and the exit time in order to measure a total time ($T_{station}$) that the client device was located at (or near to) a particular station:

$$T_{station} = T_{exit} - T_{entry}$$

Station data collection manager 352 may subsequently derive station data 382*a* and store this within station data storage 330. In some examples, station data 382*a* may comprise one or more of an indication of client entry or exit at a station, a recorded or measured time of entry ($T_{entry}$) or time of exit ($T_{exit}$) and a duration of stay ($T_{station}$) at the station. Each value or unit of data comprised within station data 382*a* may be associated with a particular station and a particular client. In other examples, station data 382*a* may not directly comprise $T_{station}$ but may instead comprise a related value or quantity derived from it. For example, station data 382*a* may comprise a value equal to $T_{station}$ less a time $T_{offload}$, wherein $T_{offload}$ corresponds to an elapsed time taken to offload a substance (such as oilfield water) from a vehicle at a substance transfer station (for example a saltwater disposal station). In this way, the station data 382a may comprise values that more closely represent a pure waiting time at a station ($T_{wait}$), rather than a total time at the station ($T_{station}$) that is inclusive of both a wait time and an offload time. In some examples, the time $T_{offload}$ may be based on a measured value, for example using flow sensors on the truck or on hose or station equipment to detect the active offloading of water and the time taken to complete an offload. Measurements from such sensors may be relayed to the client for example via short range wireless communications such as Bluetooth or Wi-Fi and may further be relayed onwards to the server via any suitable network. Alternatively, measurements from the sensors may be relayed to the server via a network without communication via the client. In other examples, $T_{offload}$ may be determined with assistance or input from a user 190. For example, a user may interact with a client device to indicate a start of an offload, and again to indicate the end of an offload. The system may then determine $T_{offload}$ based on a difference between the starting and ending times of the offload as indicated by the user. The user may additionally interact with the client device to enter an amount, volume, or type of water (or other substance) transferred at the station during the offload. In yet further examples, $T_{offload}$ may simply be an average, estimated or constant value, such as a typical or expected time required to offload a full truck load of water at a saltwater disposal station. Whilst less accurate than a measured value, this may still allow for the removal of an approximated offload time from the collected station time measurement. As well as comprising $T_{station}$ or a value derived therefrom, station data 382a may also comprise additional information such as a time of day, or day of the week, at which the user's visit to the station was made.

Over time, station data collection manager 352 may measure a plurality of station entry or exit instances, times of entry or exit ($T_{entry}$ and $T_{exit}$) or durations of stay ($T_{station}$) values, and each may be tagged or associated with a particular substance transfer station, a particular client and a particular date and time. The corresponding station data 382a for each of the plurality may be stored in station data storage 330. By performing repeated measurements over a period of time (using client location information 372 for a potential plurality of different clients), station information processing manager 350 is able to build a comprehensive measured data set that is related to visits made by users of the online platform to known substance transfer stations, when they arrived, when they departed, how long they spent there and so forth.

In other aspects of its operation, station information processing manager 350 may receive client location information 372b relating to a location of a client 102b of user 190b. Client 102b may or may not be one of the clients that station data collection manager 352 has previously collected station data from (for example, measurements of $T_{station}$ may or may not have been previously made using client location information 372 from client 102b). In examples, user 190b may be a truck driver located at an oilfield drilling or well site with a load of oilfield waste water to dispose of. User 190b may therefore wish to select a saltwater disposal station to use that will minimize a journey time or cost, a wait time or cost, or a total time or cost for the disposal.

To aid selection of a suitable disposal station, user 190b may use a client application 430 that is executed on his or her client device 102b to access station information. As part of its operation, the client application 430 may cause the client device 102b to transmit a current location to server 106. The current location of user 190b may be comprised within client information 372b as depicted in FIG. 3B.

In examples, user 190b may launch the application and indicate a desire to select a disposal station. User 190b may also enter additional user configuration details or user preferences, for example a volume, type or quality of water to dispose of, journey routing preferences or disposal company preferences. Such user configuration and preferences may be comprised within inbound client communications 386b transmitted by client 102b to server 106 wherein they may be used to control or modify the functionality of station information processing manager 350.

In examples, the current location of client 102b (as may be comprised within client location information 372b) may be passed to a journey estimation manager 354 where it may be used as an assumed starting location for a journey to a substance transfer station. Journey estimation manager 354 may also receive road and traffic information 374, for example from road and traffic database 320, and station location information 370 for example from transfer station database 322. Using the supplied information, journey estimation manager 354 may determine the routes of one or more candidate journeys, each candidate journey originating from a starting location (such as the current location of user 190b) and ending at a destination (such as the location of a particular substance transfer station). In some examples, the candidate journeys may be one-way (from the starting location to the destination), whereas in other examples the candidate journeys be a return round-trip (from the starting location to the destination, and back to the starting location). In yet further examples, the candidate journeys may be from a user-specified starting location (such as a current location of the user or a first oilfield drilling or well site) to a user-specified destination location (such as a second oilfield drilling or well site) via an intermediate location (such as a saltwater disposal station).

Journey estimation manager 354 may determine a plurality of candidate journeys, each associated with a particular substance transfer station. In determining the candidate journeys, journey estimation manager 354 may use road network data and/or live traffic information comprised within the road and traffic information 374 to determine a shortest or fastest route. Journey estimation manager 354 may also determine candidate journeys and the routes thereof based on configurations or preferences such as those received by client interaction manager 358 in inbound client communications 386b, or those stored within configuration storage 324. For example, a user 190, subscriber 195 or administrator 197 of online platform 180 may configure journey estimation manager 354 to determine candidate journeys that avoid the use of minor roads, or have a distance of less than 100 miles. In further examples, journey estimation manager 354 may determine which substance transfer stations to include as candidate stations based on user configuration or other rules, such as may be comprised within configuration information 378. For example, a truck driver may be carrying water for a particular oilfield operator company "$O_1$" who has a master services agreement (MSA) with two disposal companies "$D_1$" and "$D_2$". Trucking company "$T_1$" who employs the driver may therefore be constrained to disposal only at stations owned by companies $D_1$ or $D_2$. Journey estimation manager 354 (or in some embodiments, station information determination manager 356) may therefore only include stations owned by companies $D_1$ or $D_2$ as candidate stations based on user preferences or configuration information 378 that informs station information processing manager 350 of this constraint. Stations owned and operated by a further disposal company "$D_3$" may be excluded from the list of candidate stations delivered to the truck driver of company $T_1$ due to the absence of a commercial agreement or contract between oilfield operator company $O_1$ and disposal company $D_3$.

In examples, journey estimation manager 354 may pass information regarding the candidate journeys (within journey information 380) to a station information determination manager 356. The journey information may comprise any information related to the candidate journeys, including but not limited to their distance, their route, their expected journey times, expected speeds or traffic conditions along the route, a starting location, a destination location, an associated substance transfer station, a via location or an onward destination.

In embodiments of system 200, station information processing manager 350 may comprise a station information determination manager 356 for determining station information 384. In some examples, the station information 384 may provide information regarding a plurality of candidate substance transfer stations in order that user 190b may subsequently select an optimum or preferred station from the plurality. In other examples, and if configured to do so, station information processing manager 350 may itself select or propose an optimum or preferred substance transfer station from the plurality based on defined criteria, thereby obviating the need for the user 190b to make the selection. For example, client interaction manager 358 may be configured either to provide station information 384 regarding a plurality of candidate substance transfer stations to the use, or may be configured to select and provide station information 384 for only one of the plurality of candidate substance transfer stations to the user. An optimum or preferred station may, for example, be one that has available capacity, can dispose of a certain substance such as a type or composition of oilfield water, or may be one that minimizes a journey time to the station, a wait at the station, a total journey-plus-wait time, or a total cost of substance transfer at the station (for example comprising costs due to the journey, the wait and any substance transfer fees). In some examples, station information 384 may be based on station data 382b stored within station data storage 330. In some examples, the station data 382b may comprise or be based on values of $T_{station}$ measured and collected by station data collection manager 352. In other examples, the station data 382b may comprise instances of entry or exit, or times of entry or exit ($T_{entry}$ or $T_{exit}$). In yet further examples, the station data 382b may comprise a number of visits made to a station during a time period (such as during the current day) or may comprise estimates of remaining disposal capacity at the station. Station data 382b may further comprise a station and/or client identifier that is associated with a visit, an entry or exit instance, or with a measured value such as $T_{station}$, $T_{entry}$ or $T_{exit}$.

In order to determine station information 384, station information determination manager 356 may take into account journey information 380 received from journey estimation manager 354 and any available station data 382b such as may be received or retrieved from station data storage 330 or (yet not explicitly shown in FIG. 3B) directly from station data collection manager 352. As has been previously described, station data storage 330 may comprise extensive data regarding the times, dates and durations of historical visits made by various users of online platform 180 to the various substance transfer stations known to transfer station database 322. Station information determination manager 356 may analyze this historical station data 382b in order to estimate or predict station information 384 indicative of a situation that is likely to be experienced by user 190b when visiting the station at a current time, in the near future or at some prescribed time in the future. In general, the station information 384 may comprise any information related to previous, current or forecast conditions at a substance transfer station, a journey to a station, a capacity at a station or a cost or incentive associated with a station. The station information 384 may assist a user of the system to identify or select a substance transfer station that best serves his or her needs, or which optimizes a particular criterion such as a time or a cost to the user. The station information 384 may be based on i) information on station visits comprised within station data 382, ii) journey information 380, or iii) a combination thereof. Station information 384 may also be based on additional factors or variables (for example comprised within user preferences of inbound client communications 386b or within configuration information 378), such as the cost of fuel, vehicle fuel consumption, the cost of labor, station fees, water disposal volumes, water qualities, water types or water compositions and so forth.

Non-exhaustive examples of station information 384 are provided in Table 1:

TABLE 1

Examples of Station Information

| Parameter Name | Description | Additional Notes |
|---|---|---|
| $N_{visitors}$ | A current, previous or expected number of visitors at a station | By monitoring the locations of its users, the system is able to determine a number of users at a station. This may be a current, previous or expected value, and may further be based on historical data, such as the average number of visitors on a given week of the year, day of the week, or a given time of day. |
| $N_{queue}$ | A current, previous or expected number of visitors queuing or waiting for service at a station | In some examples, this may be derived from $N_{station}$. If there are $N_{visitors}$ at a station at which there are known to be $N_p$ hook-ups (or service points), then the system may determine that there are $N_{queue} = (N_{visitors} - N_p)$ users waiting for service at the station. In other examples, $N_{queue}$ may be based on user feedback sent by users actually at the station. |
| $F_{arrivals}$, $F_{departures}$ | A current, previous or expected frequency of arrivals or departures at a station | By monitoring the locations of its users, the system is able to determine how many users arrive-at or depart-from a station during a given time period (such as per hour). This may be a current value based on the number of visits during a most recent time period, or may be a previous or expected value based on historical data, for example an average number of visits per hour at a given time of day, day of the week or week of the year. |
| $T_{station}$ | A current, previous or expected total duration at a station | By monitoring the locations of its users, the system is able to determine how long users spend at a station, for example by determining a difference between an entry time $T_{entry}$ an exit time $T_{exit}$. This may be a current or most-recent value, an average or weighted sum of previous values, or an expected value based on current or historical data. The value may further be based on a time of day, a day of the week or a week of the year. |
| $T_{wait}$ | A current, previous or expected | This is the time that a user has to wait at a station before being serviced. In examples, the system may estimate $T_{wait}$ by subtracting |

TABLE 1-continued

Examples of Station Information

| Parameter Name | Description | Additional Notes |
|---|---|---|
| | waiting time at a station | an 'in-service' time (such as $T_{offload}$), and optionally any known overhead time $T_{overhead}$, from a total station time (such as $T_{station}$). In other examples, the system may use input from a user to assist with determination of the waiting time. For example, the system may detect that a user has arrived at a station and may prompt the user to notify the system when substance transfer serve begins (deeming the intervening time as wait time). $T_{wait}$ may be based on a current or most-recent value, an average or weighted sum of previous values, or an expected value based on current or historical data. The value may further be based on a time of day, a day of the week or a week of the year. |
| $T_{journey}$ | A current or expected journey time to a station | The system may estimate a current or expected journey time to or via a station along a route from a starting location to a destination location. The time may be for a one-way journey to the station, a round trip journey or a trip to the station and onwards to a final destination. $T_{journey}$ may be based on any of a distance of the route, road types or characteristics, traffic conditions and vehicle type. |
| $T_{total}$ | A current, previous or expected total time associated with a journey, wait and disposal at a station | In examples, this may be a sum of $T_{journey}$ and $T_{station}$, each of which have been described above. |
| $C_{journey}$ | A cost associated with a journey to a station | The system may determine a cost of a journey based on distance, fuel costs, vehicle type and so forth. For example, $C_{journey}$ may be determined as:<br>$C_{journey} = (D_{journey} \times C_{fuel-per-mile}) + (T_{journey} \times C_{labor-per-hour})$<br>Where:<br>$D_{journey}$ is a distance of the journey in miles<br>$C_{per-mile}$ is a fuel cost per mile<br>$T_{journey}$ is the traveling time of the journey in hours<br>$C_{labor-per-hour}$ is a driver labor cost per hour |
| $C_{station}$ | A cost associated with a current or expected total duration at a station | The system may determine a cost of time spent at a station, for example $C_{station} = T_{station} \times C_{labor-per-hour}$<br>Where:<br>$T_{station}$ is a total time (in hours) at the station inclusive of waiting time and service time<br>$C_{labor-per-hour}$ is a driver labor cost per hour |
| $C_{fee}$ | A cost associated with substance transfer fees at a station | For example, a saltwater disposal fee at a station. $C_{fee}$ may have a fixed component and may further be a function of the amount or type of substance that is to be transferred. For example, $C_{fee}$ may be:<br>$C_{fee} = C_{service} + (C_{per-barrel} \times V)$<br>Where:<br>$C_{service}$ is a fixed service fee per visit<br>$C_{per-barrel}$ is a cost per barrel of saltwater<br>V is a volume of saltwater to be disposed of<br>In the above example, $C_{per-barrel}$ may also vary as a function of the type, quality or composition of the saltwater to be disposed of. |
| $C_{total}$ | A total cost associated with a journey, wait and substance transfer or disposal fee at a station | In examples, the total cost of disposal may be determined as a sum of journey costs and station costs, e.g.<br>$C_{total} = C_{journey} + C_{station} + C_{fee}$ |
| $R_{station}$ | A current or remaining capacity available at a station | Practical or regulatory limits may exist at substance transfer stations (such as oilfield water disposal stations) regarding the aggregate amount of the substance that may be transferred or disposed of. Such an amount of remaining capacity may be included as part of the station information. In some examples, $R_{station}$ may be estimated or based on the number of users visiting a station over a time period (see for example $N_{visitors}$, $F_{arrivals}$ and $F_{departures}$ above), for example by estimating or monitoring the disposal volumes made by each user when visiting a station and subtracting a sum of such volumes from a maximum or allowable disposal capacity at the station during the time period. In other examples, $R_{station}$ may be a current, estimated or measured capacity $R_{station}$ provided by a disposal company or station. $R_{station}$ may provide a user with information on an actual used or available capacity or may indicate only whether capacity is available or not. In examples, $R_{station}$ may be dependent on current tank capacity, pressure levels, fluid viscosity, pumping power, rate of injection, permeability of the underground formations and the size of the injection interval, contractual capacity, pump volume limitations, and regulatory constraints. |
| $I_{station}$ | An incentive or rebate offered to encourage use of the station | Disposal companies may wish to encourage the use of one or more of its stations by offering incentives or rebates payable to users visiting the station or to related commercial entities. In examples, such incentives may be based on available capacities at the stations, a user location, a commercial affiliation of a driver, transportation company or operator company, or on a number of prior visits made to the station or to stations of the same disposal company. |

Parameters and values of the system information may be determined based on measurements or based on user feedback as a result of interaction between a server of the online platform and one or more clients.

For any of the parameters listed in Table 1, and more generally, for any component of station information 384, the parameter may represent a current value, a previous value, or a value expected at a time in the future. Additionally, any parameter of station information may be determined from a single measurement or value, or may be determined from a plurality of values, for example by performing an averaging operation or a weighted sum over the plurality of values.

As an illustrative example, station information determination manager 356 may form an estimator of $T_{station}$ in a number of different ways. In a first example, $T_{station}$ may be an average, mean, or weighted sum of all recorded $T_{station}$ values measured at that station. In a second example, $T_{station}$ may be an average, mean or weighted sum of all recorded $T_{station}$ values at that station since a predetermined date or time, such as within the last month. In a third example, $T_{station}$ may be associated with time of day, a day of the week or a week of the year such that diurnal, weekly and annual variations in the historical station data 382b may be accounted for. Thus, in examples, station information manager 356 may analyze station data 382b and group the measured $T_{station}$ values for a given station into hourly buckets (e.g. those measured between 8 am and 9 am of any day in a first bucket, those measured between 9 am and 10 am of any day in second bucket and so forth). Station information determination manager may then calculate a mean, average or weighted sum of all measurements for that station within a given bucket in order to determine a $T_{station}$ value that is associated with an hour of the day. Similar principles may be applied to any time period, such as a day of the week or a week of the year. By doing so, in some examples, station information determination manager 356 may provide station information 384 likely to be encountered by a user of the system on a given day or at a given time. By means of example, user 190b may indicate an immediate readiness to travel and dispose of water. In response, station information determination manager 356 may use journey information 380 to predict an expected time of arrival (ETA) at each of three candidate disposal stations. The hours of the day corresponding to the three ETAs may be denoted $h_1$, $h_2$ and $h_3$ respectively. Station information determination manager 356 may then consult and analyze historical station data 382b for each of the three candidate disposal stations, in order to determine $T_{station}$ (h, n) for an hour of the day "h" at station "n". Thus, station information determination manager 356 may determine $T_{station}(h_1,1)$, $T_{station}(h_2,2)$ and $T_{station}(h_3,3)$. In examples, the station information 384 sent to the user may directly comprise the three values of $T_{station}$ in order that the user may compare these and select a station to use. In other examples, the station information 384 sent to the user may not directly comprise the three determined values of $T_{station}$ but may instead comprise other values derived from them. For example, the station information 384 may comprise three total cost values for saltwater disposal at each respective station:

$$C_{total}^{(n)} = C_{journey}^{(n)} + C_{station}^{(n)} + C_{fee}^{(n)}$$

Where:
  $C_{total}^{(n)}$ is the total cost for station 'n'
  $C_{journey}^{(n)}$ is the journey cost for station 'n'
  $C_{station}^{(n)}$ is the labor cost associated with a total station time at station 'n', which may itself be determined as: $C_{station}^{(n)} = T_{station}(h, n) \times C_{labor-per-hour}$
  $C_{fee}^{(n)}$ is a fee for saltwater disposal at station 'n'

As a further illustrative example, the system may determine an expected remaining capacity $R_{station}$ at a station based on an allowed disposal capacity limit within a time period and on information collected from users known to have visited or otherwise used the services of the station during the same time period. The allowed disposal capacity limit may be a daily limit imposed by a government or regulator or may be a function of one or more technical attributes of the station, such as a tank battery volume, a maximum rate at which water may be treated or pre-processed prior to its disposal, a maximum achievable or allowable flow rate downhole into the wellbore or injection formation or a maximum achievable or allowable pressure in the injection formation. The maximum pressure may be set well below the pressure that an injection formation can withstand before it disintegrates or to limit seismic risk (which is itself a function of the depth of the well and proximity to known fault lines or seismic events). Variables that affect the pressure level include fluid viscosity, pumping power, rate of injection, permeability of the underground formations and the size of the injection interval. The remaining capacity of underground formations also affects pressure within the wellbore (which will rise as its capacity limit is reached), hence monitoring of such underground pressures may therefore be used as one input to determine the ability (or not) of a disposal well to accept further waste water. In examples, the system may maintain a cumulative count of the amount or volume disposed of by users (for example, arriving by truck or by pipeline) and may subtract this from the allowed disposal limit to determine the disposal capacity remaining. In some examples, the amount or volume disposed of may be measured, for example by flowrate, weight or other sensors that may be in communication with the client device or with the server. Such sensors may be part of the client device or may be attached to a vehicle of the client or to station equipment such as hoses, inflow or outflow pipelines, pumps or storage tanks. In other examples, the amount or volume disposed of may be estimated by the system (for example by determining, using reported location information, a number of trucks visiting the station and multiplying this by an assumed average amount offloaded per truck) or may be measured by the system using sensors at the stations or on user vehicles. Alternatively, the amount or volume disposed of may be based on information input to the system by the users themselves (e.g. via user interaction with a client device). In further examples, the system may determine an expected time until the capacity limit is reached at a station, for example by determining a current remaining capacity and extrapolating an estimate of future used capacity (until it reaches the capacity limit) based on a rate at which disposal capacity is being consumed at the station.

In yet further examples, the station information may distinguish between capacity at a station that is used or available for truck-based offload, and capacity at a station that is used or available for pipeline-based offload. Thus, in examples, the station information may include an indication of available truck-based disposal capacity at a station that is determined based on a total capacity of the station minus a capacity that has been (or is being) used by a pipeline input to the station. In other examples, the station information may include a dynamic or 'live' capacity indication such as a percentage of a maximum allowable inflow rate that is currently being utilized at a station (whether due to water inbound via pipeline or by truck). In extension, such a live capacity indication may be split into two components, one representing the current amount of truck-based capacity that is being used or which is available, and the other representing the current amount of pipeline-based capacity that is being used or which is available.

In determining available capacity, station information determination manager 356 may utilize additional information such as regulatory limits prescribed in granted disposal permits, sensor-based information or seismic activity measurements or bulletins that currently (or soon will) affect the allowable capacity at disposal stations within a geographic region. In examples, sensor-based information includes tank utilization, communicating the current fullness of a tank. In examples, the sensor-based information may originate from flowrate sensors on a pipeline input to the station or on a hook-up pump at the station, or from pressure sensors "downhole" within a wellbore wherein rising pressure may be indicative of a reduced remaining capacity within the underground injection formation. The additional information may be received or retrieved from sources that lie external to server 106, such as information storages 150a-c. In examples, station information determination manager 356 may receive a measurement or a bulletin of detected seismic activity at an epicenter, and may determine a number of stations (for example, those within a given radius of the epicenter, or those associated with a disposal well of a given injection depth or geology) which are likely to experience a tightening of imposed regulation and therefore reduced capacity. In other examples, station information determination manager 356 may receive information from a flowrate sensor on a pipeline input to a station indicative of a current surge in piped water that is likely to restrict the amount of trucked water that the station can accept. In further examples, rising pressure information received from a wellbore pressure sensor may indicate that a capacity of the injection formation is close to being reached, or a sudden drop in pressure (with continued flow) may indicate a breakdown or damage to the injection formation, or cross-linking with another formation, fault or reservoir. The system may notify users of such events and/or may account for the events in the station information that is supplied to the users. For example, station information 384 may indicate a predicted, actual or imposed capacity reduction at affected stations or may "tag" affected stations as potentially-impacted such that the client device may notify the user accordingly via a suitable graphical or textual display of the information.

Once station information determination manager 356 has determined station information 384 of relevance to a user, this may be stored within station information storage 328 and/or passed to client interaction manager 358. In examples, client interaction manager 358 may be responsible for managing communications between a station information processing manager 350 of server 106 and a user such as user 190b. Such communication may comprise outbound client communications 386a and inbound client communications 386b. The outbound client communications 386a may comprise the determined station information 384 corresponding to stations of potential interest to the user.

Whilst the description of FIG. 3B is based on an embodiment of the station information processing manager 350 within a server 106, it shall be appreciated that this serves as only one example. Other embodiments are also possible in which some or all functionality of station information processing manager 350 is performed by a client 102 rather than by a server 106 or is otherwise distributed between the client and server. For example, an application 430 running on a client device 102 may comprise a transfer station database 322 and a road and traffic database 320. The client device 102 or client application 430 may therefore be capable of operating its own journey estimation manager 354 to determine the routes and times of journeys to candidate substance transfer stations (for example from a current location) and may upload such journey information 380 to the server 106 where it may serve as one of the informational inputs to station information determination manger 356. In other examples, a client 102 or client application 430 may comprise a transfer station database 322 and may record its own arrival times, departure times or durations ($T_{entry}$, $T_{exit}$, $T_{station}$) at known stations and may upload this information to server 106 as opposed to (or in addition to) client location information 372. In doing so, client 102 may perform one part of the functionality of station data collection manager 352, rather than relying on the sever 106 to do so.

By executing some or all functionality of station information processing manager 350 on a mobile client device 102 rather than on the server 106, the system may be able to operate even during times at which there is a loss of connectivity (for example a loss of cellular network coverage) between the client and the server. Thus, in some embodiments, a client 102 may comprise all functionality of station information processing manager 350 that is necessary (in addition to any storage or databases that are needed) in order for the client to autonomously determine station information 384 whilst 'offline' or temporarily disconnected from the server. As one example of such an embodiment, client 102 may comprise local copies of a transfer station database 322, a road and traffic database 320 and station data storage 330. Client application 430 may then determine station information 384 using a station information determination manager 356 of the client application 430, by using the station data 382b stored within station data storage 330, optionally in conjunction with journey information 380 determined by a journey estimation manager 354 also located within the client application 430. In this way, the client application is still capable of providing useful information to the user even when the user is located in an area without wireless network coverage. In such an embodiment, any copies or mirrors of the server databases or storages held locally on the client device may be updated on the client once network connectivity between the client and server is restored.

Figure 4:
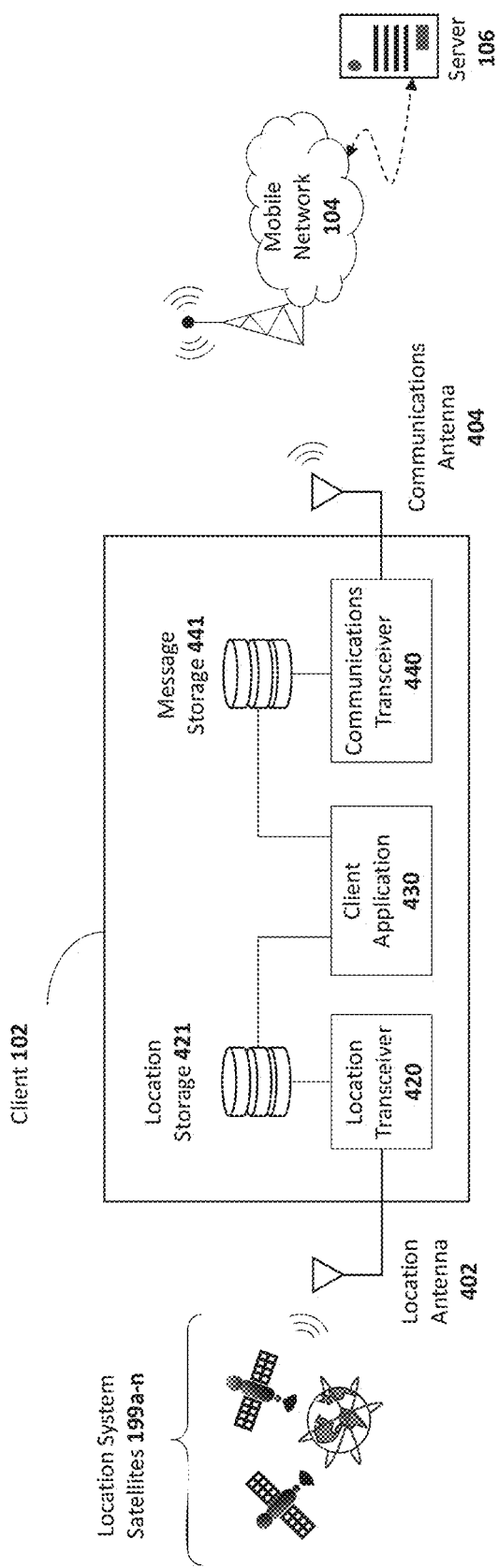
FIG. 4 shows a user client of a substance transfer station information system, according to some embodiments.

FIG. 4 shows a client 102 of a substance transfer station information system 200, according to some embodiments. In FIG. 4, client 102 is location enabled in that it is capable of determining its own location, for example through the use of a suitable satellite location technology such as GPS. Client 102 therefore comprises a location transceiver 420 coupled to a location antenna 402 in order that it may receive location radio signals such as those from one or more location system satellites 199a-n orbiting the earth. In examples, client 102 may be a smartphone, a tablet computer, a laptop computer, an in-vehicle automotive system, a GPS tracking device, or an embedded component of another computing system.

Location transceiver 420 may process the location radio signals received from location system satellites 199a-n in order to measure its global location at a given time "t". Such processing may, for example, include determining a time of arrival of a plurality of radio signals (received at location antenna 402) that emanate from a respective plurality of location system satellites 199a-n. In examples, client 102 may store one or more of the measured locations in location storage 421, where they may be accessed by a client application 430.

Client application 430 may be an application, service, daemon, routine, or other executable logic for assisting a server 106 of a substance transfer station information system 200. In examples, client application 430 may be configured to execute instructions on a processor of client 102 that cause client 102 to measure and store a history of its locations and to communicate (for example within client location information 372) such a location history to a server 106. The communication of the client's location history to the server may be performed by wired or wireless means over a network 104. In examples, client 102 includes a communications transceiver 440 coupled to a communications antenna 404 that may be the same or a different antenna to location antenna 402. The client application 430 may be configured retrieve one or more historical client locations from location storage 421 and to wirelessly transmit this client location history over a mobile network 104 to server 106. Mobile network 104 may comprise one or more wireless basestations and one or more core network components. More generally, client application 430 may be configured to exchange various communications with server 106 (such as client communications 386a and 386b) via communications transceiver 440. Such communications may comprise messages that may be buffered or stored for transmission or reception in message storage 441.

In embodiments, client application 430 may be configured to transmit, on an ongoing and semi-real-time basis, the most recent stored location that is available within location storage 421. In this manner, client 102 provides a "live" or current location update (for example within client location information 372) to server 106. There may be times however when client 102 is either unable to communicate with server 106 (for example when out of signal coverage of mobile network 104) or is configured not to communicate a live location (for example to conserve battery power of the client 102 or to conserve radio communication bandwidth and resources). In such cases, client application 430 may be configured to retrieve a plurality of historical locations from location storage 421 and to transmit these (for example within client location information 372) as a batch of locations to server 106. Thus, client 102 may operate either in a 'live update' fashion, or in a 'store-and-forward' manner in which the client only sends or 'uploads' a batch of historical location points to server 106 at a point in time that may be substantially after the time at which the location points were measured.

The preceding description of FIG. 4 illustrates examples of the operation of client 102 and client application 430 in the context of recording a client location history and communicating this as client location information 372 to a server 106, where it may be subsequently used by a station information processing manager 350. It shall be appreciated however that various different embodiments of system 200 are possible in which the functionality of station information processing manager 350 is not located solely within server 106, but is instead located within the client 102 (such as within client application 430) or is distributed between the server 106 and the client 102. In examples, client 102 may comprise a road and traffic database 320, a transfer station database 322 or station data storage 330, any of which may be accessible by a journey estimation manager 354 or a station information determination manager 356 comprised within client application 430, such that the client 102 may itself determine the routes of journeys to candidate substance transfer stations or station information 384 of such candidate stations, rather than relying on the server 106 to perform some or all of this functionality. In examples, the client 102 may upload journey information 380 to the server for use by a station information determination manager 356 of the server. In other examples, the client 102 may provide journey information 380 to a station information determination manager 356 of the client application 430. In further examples, client application 430 may compare its current location (or previous locations stored within location storage 421) against the locations of known transfer stations (for example, as may be stored within a transfer station database 322 on the client 102), in order to determine the times and durations of any visits to the known substance transfer stations. Client application 430 may subsequently upload information regarding the times or durations of station visits (for example as station data 382) to the server 106 where it may be stored along with station data 382 of other clients within station data storage 330 of the server for subsequent use by a station information determination manager 356 of the server. In the above examples, any transfer station database 322, road and traffic database 320 or station data storage 330 located locally on the client 102 may be updated periodically or on an as-needed basis by the server 106 via a network 104 in order that the most current information on known transfer stations, road networks, traffic information and station data may be taken into account.

Figure 5A:
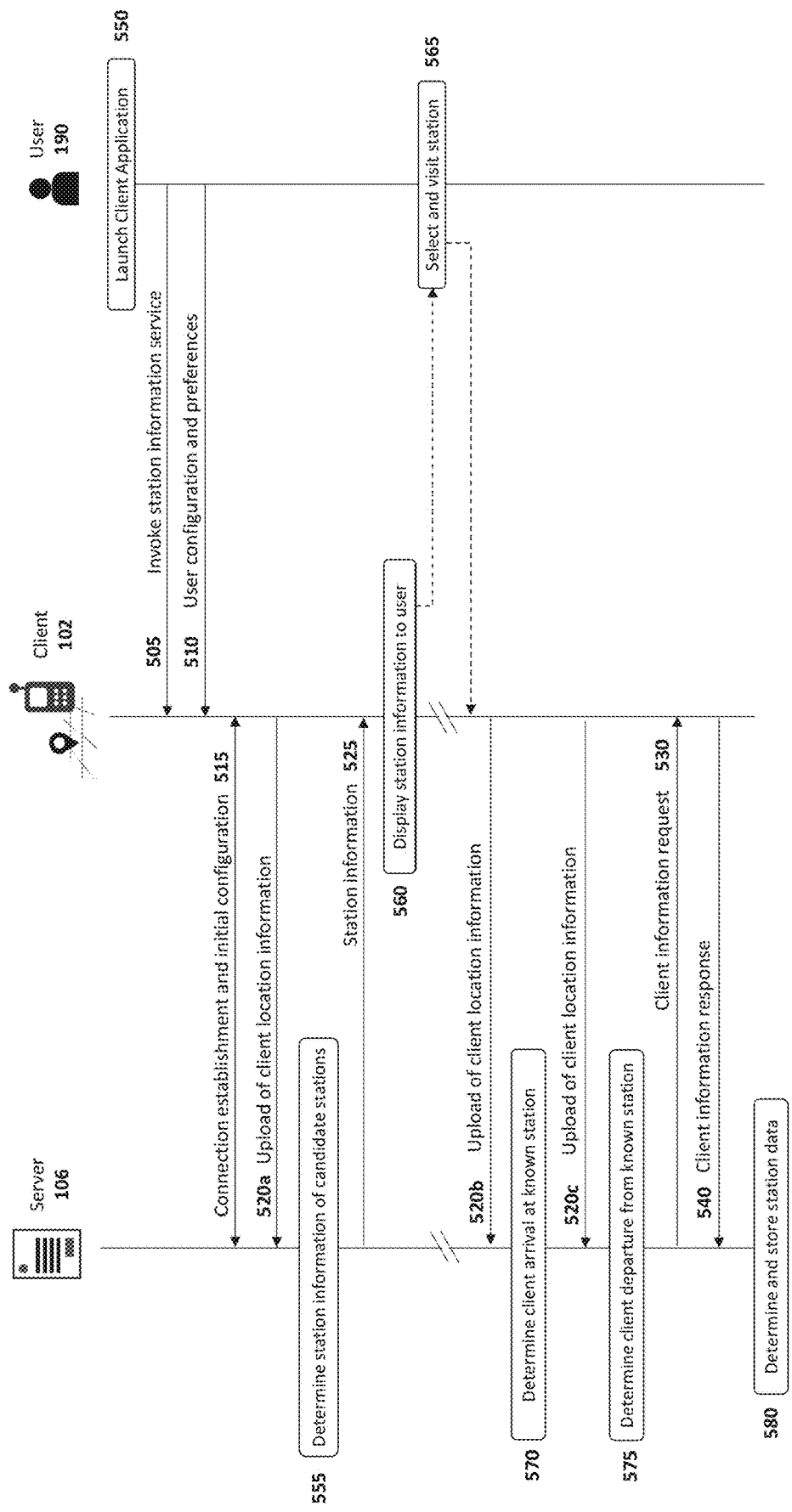
FIG. 5A illustrates an example of interactions between a server, a client and a user of a substance transfer station information system, according to some embodiments.

FIG. 5A illustrates an example of interactions between a server 106, a client 102 and a user 190 of a substance transfer station information system 200, according to some embodiments. In FIG. 5A, interactions between the server, client and user are shown in the form of a message sequence chart in which time increments vertically, from top to bottom. Within server 106, interactions with a client 102 may, in examples, be handled and controlled by a client interaction manager 358 of a station information processing manager 350. Client interaction manager 358 may therefore be responsible for sending, receiving, buffering and processing messages to and from a client 102 according to the application or communication protocols utilized by the system 200.

Referring to FIG. 5A in more detail, a user 190 such as a truck driver located at an oilfield drilling or well site and with oilfield water to dispose of, may, in step 550, determine to launch a client application 430 on the client device. User 190 may select a station information service of the client application 430 causing, in step 505, the service to be invoked on the client 102. In step 510, the user 190 may interact with the client application 430 in order to set user configuration and preferences, for example to configure the amount of oilfield water to be disposed of, its composition or type, a maximum acceptable journey distance for candidate disposal stations, and an indication that the driver is ready to depart immediately from its current location.

The client 102 and server 106 may then exchange one or more messages 515 in order to establish a connection between the server and the client and to perform an initial configuration of the client and server applications. In examples, the connection establishment and initial configuration messages 515 may facilitate an authentication of the user 190, a configuration of network addresses and resources to be used, a configuration of data transport security, a periodicity of location updates, a communication of the user configuration and preferences to the server and so forth.

In examples, following its initial configuration, client 102 may transmit or upload (in message 520a) client location information 372 to server 106. Server 106 may use the client location information 372 to establish a journey starting location for the client and (in accordance with the received user configuration and preferences) identify a plurality of candidate substance transfer stations (in this example, saltwater disposal stations) that lie within the maximum acceptable journey distance set by the user.

At step 555, server 106 may analyze or retrieve prior station data 382b held within station data storage 330 in order to determine station information 384 for the plurality of candidate stations. In examples, the station information 384 may comprise a total time $T_{total}$ for disposal inclusive of a journey time $T_{journey}$ and a likely station time $T_{station}$ for each candidate station. The likely station time $T_{station}$ may be one likely to be encountered if the user were to depart immediately and travel to the candidate station from the current user's starting location. In examples, the determined value of $T_{station}$ may be based on one or more recently measured values of $T_{station}$ (from other users of the system) or may be based on a determined diurnal variation of historical $T_{station}$ values and associated with a current time of day or an expected time of arrival of the user 190 at the respective candidate station. In examples, the journey time $T_{journey}$ may be the expected journey time from the user's current starting location to one of the plurality of candidate stations via a route determined by the server and taking into account any currently known traffic conditions.

Following determination of the station information 384 for the candidate stations, server 106 may send this to the client 102 in step 525. In examples, client 102 may then (in step 560) display (for example via a display device 124a-n of the client) the station information to the user in order to facilitate the user's selection (step 565) of a preferred station to visit. In some examples, client 102 may determine and identify an optimum station amongst the candidate stations. In alternative examples, server 106 may determine an optimum station from the plurality of candidate stations (for example, one that minimizes $T_{total}$). In such a case, server 106 may still send station information for all candidate stations to the client 102 in step 525 or may send station information only for this optimum station. Client 102 may display the locations of candidate stations (and optionally also one or more other locations such as a current location of the user or a starting or final destination location for a journey), for example overlaid on a map of the surrounding area. Client 102 may display a list of candidate stations along with the respective station information for each or may display the station information for only the optimum station. The client may identify (for example via the display) a ranking of candidate stations according to a criterion (such as time or cost) and/or may identify an optimum station amongst the candidate stations. The optimum station (whether determined by the server, or by the client device) may be identified on a display of the client device via any suitable graphical or textual representation, including but not limited to descriptive text, an ordering of stations on the display, highlighting of text, graphics or map display content, an annotation of text or graphics, placement or content of text, images or icons, graphical animation, flashing, blinking, encircling, 'starring' and so forth. In other examples, the client 102 may present or convey the received station information for candidate stations or a station identified as optimum, in other ways, such as by spoken audio through a loudspeaker.

User 190 may then journey to the selected station and may be configured to send client location information 372 at periodic intervals to the server during the journey. At step 570, server 106 may determine at step 570 and based on receipt of one such piece of uploaded client location information (shown in FIG. 5A as message 520b), that the client has arrived at a known station (for example, based on a determination that the client is located within a geofenced region enclosing the known station).

The user may then use the substance transfer—(in this example, water disposal—) facilities and services of the station and subsequently depart from the station. Server 106 may determine that the client 102 has departed based on a further piece of uploaded client location information 520c.

In some examples, server 106 may request, via a client information request message 530, feedback from the user or client regarding the recent station visit. Such a request may for example solicit information as to how satisfied the user was with the station, whether the waiting times were acceptable or whether the forecast waiting times were accurate. In some examples, the server 106 may also determine a degree of accuracy of the predicted station information by comparing measured $T_{station}$, $T_{journey}$ or $T_{total}$ times with the original predictions and use this to improve future predictions. In some examples, client 102 may provide the requested information in a client information response message 540.

At step 580, server 106 may store (for example in station data storage 330) any station data 382a determined from user 190's visit to the station for subsequent retrieval and analysis when determining station information 384 for other users of the system.

Figure 6:
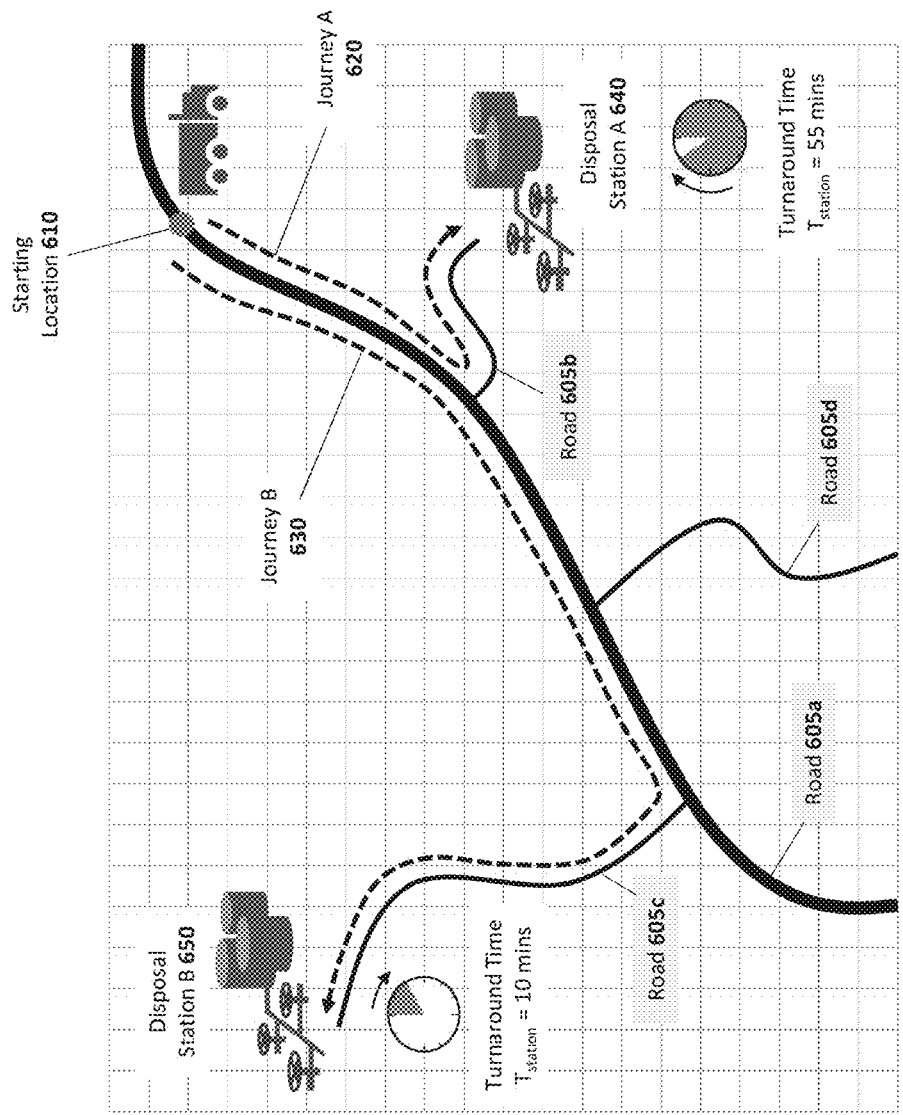
FIG. 6 shows an example portion of terrain comprising two candidate saltwater disposal stations and a start location of a client device.

FIG. 6 shows an example portion of terrain comprising two candidate substance transfer stations (in this example saltwater disposal stations) and a start location 610 of a client device 102. The two disposal stations are shown as disposal station A 640 and disposal station B 650. In examples, a station information processing manager 350, for example of a server 106, may receive from a client 102, starting location 610 in the form of client location information 372. A journey estimation manager 354 of station information processing manager 350 may determine journey A 620 to disposal station A 640 and may determine journey B 630 to disposal station B 650. As an illustrative example, journey estimation manager 354 may estimate journey A 620 to be 30 miles in distance with a journey time of 1 hour and may estimate journey B 630 to be 48 miles in distance with a journey time of 1 hour 30 minutes. However, a station information determination manager 356 of station information processing manager 350 may also determine that a disposal turnaround time $T_{station}$ at station A is 55 minutes whereas a disposal turnaround time $T_{station}$ at station B is only 10 minutes. Thus, despite the longer journey time to station B, station information determination manager may determine that a total disposal time comprising both the journey time and turnaround time is smaller for station B than it is for station A. That is:

Station A: $T_{total}=T_{journey}+T_{station}=1$ hour+55 minutes=1 hr 55 mins

Station B: $T_{total}=T_{journey}+T_{station}=1$ hour 30 minutes+10 minutes=1 hr 40 mins Station information processing manager 350 may therefore provide the estimated $T_{total}$ times for each of the two candidate stations as station information 384 to a client device 102 such that a user of the client device may select an optimum disposal station to visit.

In some embodiments, client 102 may be a smartphone, a tablet computer or a laptop, and may comprise one or more sensors 132a-n, for example including (but not limited to) a gyroscope, a barometer, an accelerometer, a magnetometer, a light sensor, a proximity sensor or a camera. In examples, the sensors of client 102 may be used to improve the accuracy of measured client locations, or to interpolate between locations measured using satellite location technology. For example, an accelerometer sensor, a magnetometer sensor and/or a gyroscope sensor may be used to determine a location of the client 102 based on the last known measurement using satellite location technology and an extrapolation therefrom using principles of dead reckoning (for example based on a measured speed and a heading or trajectory of the client). In further examples, a barometer sensor may be used to determine an altitude measurement, or to interpolate or refine an altitude measurement made using satellite location technology. In further examples, information from an accelerometer or other suitable sensor may be processed to determine a speed of a client device. In some embodiments, such sensor-based location estimates may be recorded internally to the client 102 (for example in location storage 421) and subsequently transmitted to server 106 in the form of client location information 372 (for example within a message such as message 520a, 520b or 520c).

Figure 7:
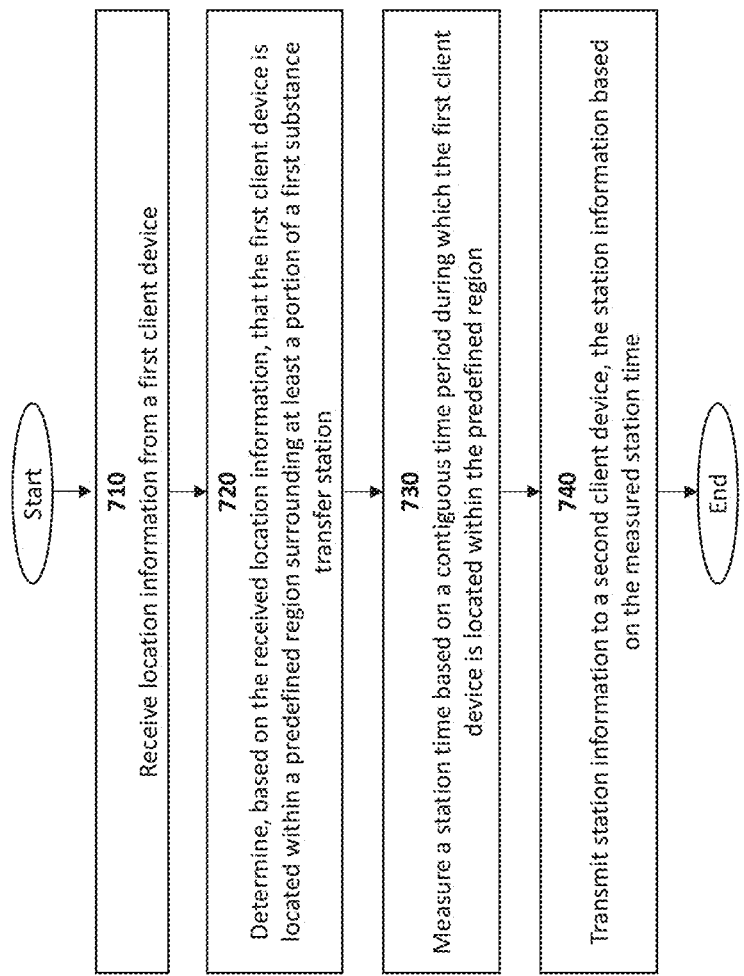
FIG. 7 illustrates an example of a method for determining information regarding a substance transfer station, according to some embodiments.

FIG. 7 illustrates an example of a method for determining information regarding a substance transfer station, according to some embodiments. The method is represented as a flowchart and in some examples, may be performed by a server 106 of an online platform 180. At 'start', the method proceeds to step 710 in which the server 106 receives location information (such as client location information 372) from a first client device (such as client 102). The location information may comprise a current 'live' location of the client 102, or a batch of locations previously recorded by the client 102.

At step 720, the server 106 may determine, based on the received location information, that the first client device is located within a predefined (or geofenced) region surrounding at least a portion of a first substance transfer station. At step 730, the server 106 may measure a station time (such as $T_{station}$) based on a contiguous time during which the first mobile device is located within the predefined region. Thus, in examples, the server 106 may record a time of entry $T_{entry}$ of the first mobile device into the predefined region and may later record a time of exit ($T_{exit}$) of the first mobile device out of the predefined region. In examples, the server may determine the station time based on a difference between the time of exit ($T_{exit}$) and the time of entry ($T_{entry}$). At step 740, the server may transmit station information (such as station information 384) to a second client device wherein the station information is based on the measured station time of the first client device. The method then ends.

Thus, in examples, server 106 may measure and store a station time of a first client device at a first substance transfer station and may subsequently use this to derive station information (for the first substance transfer station) that is of interest to a user of a second client device. In such a manner, the user of the second client device may be better informed of potential waiting times at the first substance transfer station and may take this into account when selecting a substance transfer station to visit for service.

Figure 8:
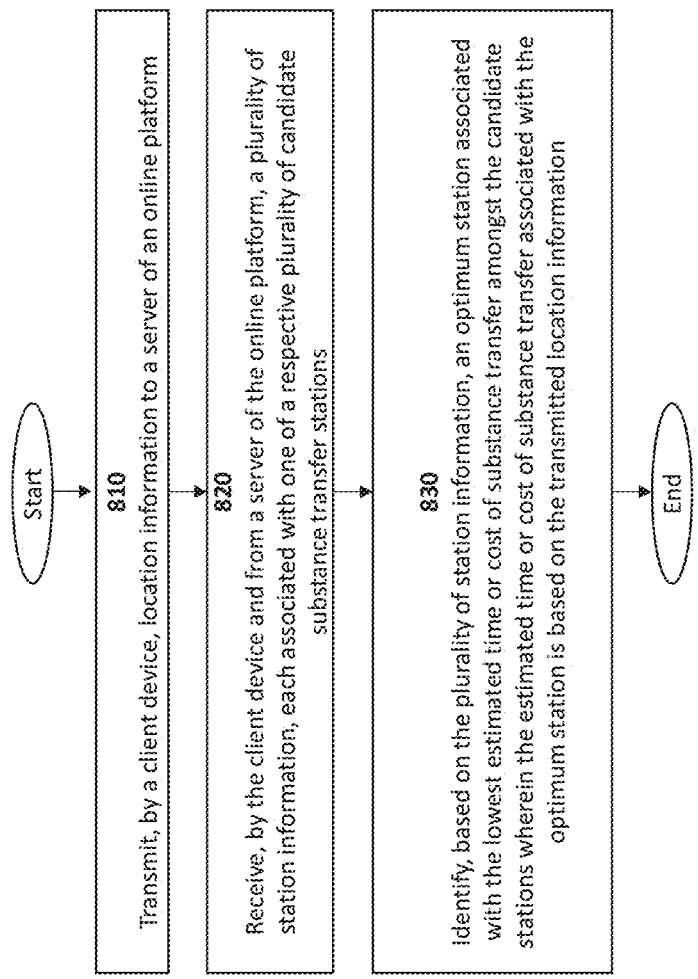
FIG. 8 illustrates an example of a method for identifying a substance transfer station, according to some embodiments.

FIG. 8 illustrates an example of a method for identifying a substance transfer station for vehicular loading or unloading of a substance, according to some embodiments. The method is represented as a flowchart and in some examples, may be performed by a mobile device or client 102 in communication with an online platform 180. At 'start', the method proceeds to step 810 in which the client device transmits location information (such as client location information 372) to a server 106 of the online platform 180. The location information may comprise a current 'live' location of the client device, or a batch of locations previously recorded by the client device.

At step 820, the client device receives from a server 106 of the online platform 180, station information (such as station information 384) for each of a plurality of candidate substance transfer stations. In some examples, the station information may comprise a time or a cost associated with substance transfer at the respective candidate station. In some examples, the candidate stations may be determined by the server based on user configuration or preferences transmitted by the client device to the server.

At step 830, the client device identifies an optimum station amongst the plurality of candidate stations, the optimum station having a lowest estimated time or cost for substance transfer. As previously described with reference to FIG. 5A, client 102 may in examples, identify the optimum station amongst a list of candidate stations via a display device 124a-n of the client using any suitable textual or graphical representation. In examples, the estimated time may be a turnaround time at a $T_{station}$, a journey time to the station $T_{journey}$ or a total time inclusive of both the turnaround time and the journey time. In further examples, the estimated cost may be a cost $C_{station}$ associated with a turnaround time $T_{station}$, a cost $C_{journey}$ associated with a journey, or a total cost $C_{total}$ inclusive of costs $C_{station}$ associated with a turnaround time, costs $C_{journey}$ associated with a journey and costs $C_{fee}$ associated with substance transfer fees at a station. In method 800, at step 830, the estimated time or cost associated with substance transfer at the optimum station is based on the location information transmitted by the client device to the server in step 810. In examples, the estimated time or cost may be determined by the server based on a current location of the client device comprised within the transmitted location information. The method then ends.

Thus, in examples, the station information received from the server 106 by the client device in step 820 may be based on the current location information transmitted by the client in step 810, and may in some examples, be based on an assumption that the current location corresponds to a starting location for a journey to a candidate station.

The present disclosure has described methods, systems and apparatus to detect, determine and provide substance transfer station information based on, for example, determination of station information from clients and client location information. In further embodiments, the methods, systems and apparatus may employ additional or alternative functionality in order to guide or facilitate a user's selection of a station.

In one such embodiment, system 200 may be adapted to provide promotional incentives to a user to visit a particular station, or to visit a station of a particular commercial entity.

A commercial entity with a substance to transfer or dispose of (such as an oilfield operator with saltwater returned from drilling or fracturing operations), may require the services of a disposal company. The substance may be transported from its origin to a transfer or disposal station by an intermediary transportation company. The oilfield operator may have a commercial or contractual agreement (such as a master services agreement—MSA) with one or more disposal companies that have been approved by the operator. When an operator has commercial agreements in place with multiple such disposal companies, the intermediary transportation company may have freedom to select which one of the operator-approved disposal companies to use for a given disposal load.

Figure 9:
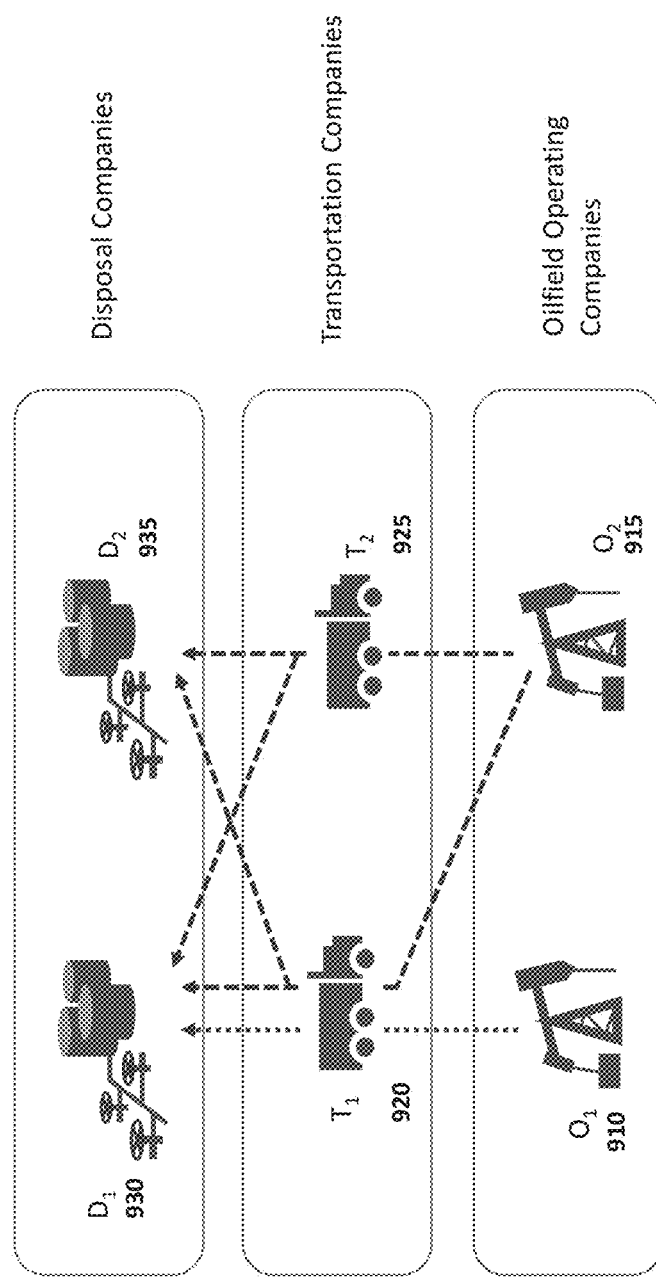
FIG. 9 illustrates examples of service relationships between oilfield operating companies, transportation companies and disposal companies, according to some embodiments.

FIG. 9 illustrates examples of service relationships between oilfield operating companies, transportation companies and disposal companies. Oilfield operating company $O_1$ 910 may have a master services agreement only with disposal company $D_1$ 930 (and not with $D_2$ 935) and may only enlist the services of transportation company $T_1$ 920 (and not $T_2$ 925). Conversely, oilfield operator $O_2$ 915 may have a master services agreement in place with both disposal companies $D_1$ 930 and $D_2$ 935 and may use the transportation services of both $T_1$ 920 and $T_2$ 925. Thus, drivers of trucks working for transportation company $T_1$ 920 may select either disposal company $D_1$ 930 or $D_2$ 935 when carrying water for disposal from operator $O_2$ 915 but may be constrained to using only disposal company $D_1$ 930 when carrying water for operator $O_1$ 910. The dashed arrows of FIG. 9 show the set of possible disposal options for the above scenario.

Disposal companies may wish to attract business at certain times and to regulate (or slow) demand at other times. Such control of business demand may target all stations of the disposal company (that is, the company wishes to generally encourage demand and increase its competitiveness against other disposal companies) or may target only specific stations. For example, when a disposal company has an excess of disposal capacity at one station "A", and a shortage of disposal capacity at another nearby station "B", it may wish to provide incentives or otherwise encourage transportation companies or operator companies to use station A, and optionally to discourage the use of station B. Such a situation may occur for example when station "B" has reached a maximum daily volume of disposal (such as a maximum treatment tank capacity, or an aggregate disposal allowance set by a government or regulator).

In embodiments, system 200 may include information regarding remaining disposal capacity, disposal fees, prices, promotional offers, rebates or incentives within station information 384 to clients 102. Such capacity, pricing or incentives information may be made available to the online platform 180 or to server 106 in numerous ways. In examples, and with reference to FIGS. 3A and 3B, disposal companies (such as $D_1$ or $D_2$) may provide the capacity, pricing or incentives information to information storage 150b or 150c such that server 106 or online platform 180 may retrieve and access it for use in determining station information 384. In some examples, server 106 may update a transfer station database 322 with capacity, pricing or incentives information from information storage 150b, whilst in other examples server 106 may update a configuration storage 324 with capacity, pricing or incentives information from information storage 150c. In further examples, a disposal company may configure server 106 or otherwise upload to server 106, the capacity, pricing or incentives information directly to transfer station database 322 or to configuration storage 324. In yet further embodiments, the capacity, pricing or incentives information may be provided by the disposal company to an administrator 197 of the online platform 180, who may subsequently update transfer station database 322 or configuration storage 324 accordingly. In all cases, the capacity, pricing and incentives information may be provided to station information determination manager 356. In examples, this may be comprised within configuration information 378, or within station data 382.

As aforementioned, in some examples, the pricing and incentives information provided to clients 102 within station information 384 may be based on capacity information. In some examples, the pricing and incentives may be determined by a disposal company (external to sever 106) based on available capacity, in which case the capacity information itself may not need to be provided to server 106. In other examples, a disposal company may configure server 106 with rules or mathematical formulae that enable a station information determination manager 356 within the server to determine pricing and incentives information based on a capacity information input from the disposal company. Thus, in examples, a disposal company may upload the latest capacity information to the server and the server may apply the configured rules or mathematical formulae to determine a price or incentive to include within station information 384.

Figure 5B:
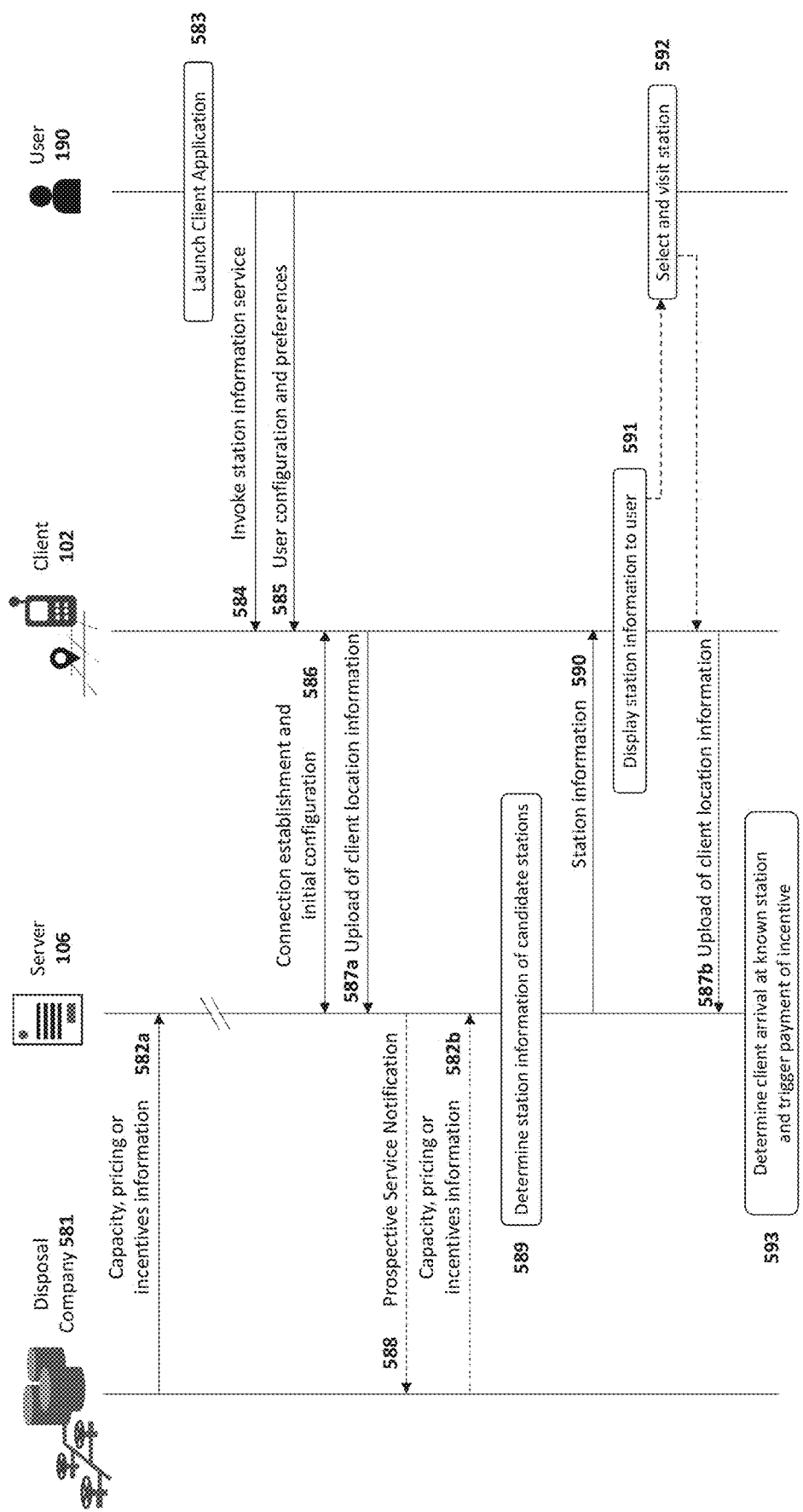
FIG. 5B illustrates an example of interactions between a disposal company, server, client and a user of a substance transfer station information system, according to some embodiments.

FIG. 5B illustrates an example of interactions between a disposal company, server, client and a user of a substance transfer station information system 200 in which capacity, pricing or incentives information is taken into account by server 106 when determining the station information to provide to a client 102. In FIG. 5B, interactions between the disposal company, server, client and user are shown in the form of a message sequence chart in which time increments vertically, from top to bottom. Referring to FIG. 5B in more detail, server 106 may receive and store capacity, pricing or incentives information 582a from a disposal company 581 or server thereof. Such information may be pre-configured by the disposal company or may be updated for example on a daily or hourly basis. At a later point in time, a user 190 such as a truck driver located at an oilfield drilling or well site and with oilfield water to dispose of, may, in step 583, launch a client application 430 causing, in step 584, a station information service to be invoked on the client 102. In step 585, the user 190 may interact with the client application 430 in order to set user configuration and preferences, for example to configure an oilfield operator who's water is being carried or is to be disposed of (hereon referred to as "$O_x$"), the amount of the water and a maximum journey distance that is acceptable to the truck driver.

The client 102 and server 106 may then exchange one or more messages 586 in order to establish a connection between the server and the client and to perform an initial configuration of the client and server applications. In examples, the connection establishment and initial configuration messages 586 may facilitate an authentication of the user 190, a configuration of network addresses and resources to be used, a configuration of data transport security, a periodicity of location updates, a communication of the user configuration and preferences to the server and so forth.

In examples, following its initial configuration, client 102 may transmit or upload (in message 587a) client location information 372 to server 106. Server 106 may use the client location information 372 to establish a journey starting location for the client and (in accordance with the received user configuration and preferences) identify a plurality of saltwater disposal stations that lie within the maximum acceptable journey distance set by the user. In some examples, server 106 may include within the plurality of candidate stations, only those stations owned or operated by a disposal company known to be approved by operator $O_x$ or to have a commercial agreement with operator $O_x$.

In some examples, server 106 is able, in step 589, to determine station information 384 for the plurality of candidate stations using the information thus-far supplied to it. Thus, server 106 may retrieve the stored capacity, pricing or incentives information received in step 582a, and in step 590 transmit station information 384 appropriate for those candidate stations to the client 102. In other examples, server 106 may optionally conduct further interaction (showed by the dotted-line arrows of FIG. 5B) with disposal company 581 (or a server thereof) in order to determine dynamic or instantaneous capacity, pricing or incentives information 582b before sending station information to the client. Thus, in examples, server 106 may analyze the client location information uploaded in step 587a in order to determine a proximity of the client to known disposal stations. Server 106 may then determine disposal companies known to own or operate the proximal stations and may send a prospective service notification 588 to those disposal companies or stations. The prospective service notification 588 notifies disposal companies or stations of potential new business and may include additional information such as a client ID, a present location or trajectory of the client 102, a transportation company of the client, an operating company who's water is to be disposed of, a volume, quality or type of the water, or one or more potential disposal stations that have been determined by server 106.

In response to the prospective service notification 588, disposal company 581 (or a server thereof) may return dynamic capacity, pricing or incentives information 582b.

For example, a server of disposal company 581 may indicate capacity availability at four of its potential stations but not at a fifth potential station. In other examples, a server of disposal company 581 may indicate capacity at all of its potential stations, but in light of an excess of capacity at one of them, offer an incentive or a reduced disposal fee for that particular station.

At step 589, server 106 may use or include any received dynamic capacity, pricing or incentives information 582b when determining station information to provide to the client in step 590. In examples, this may include determining a price or incentive based on received capacity information. In further examples, this may include determining a price or incentive based on other factors such as a location of the client, a proximity of the client to a station, a commercial affiliation of a driver, transportation company or operator company, a number of previous visits to a station or disposal company or a number of such previous visits within a time period. In yet further examples, this may include relaying, to a client 102, station capacity information received from disposal company 581.

Client 102 may subsequently (in step 591) display the station information (for example via a display device 124a-n of the client) to the user in order to facilitate the user's selection (step 592) of a preferred station to visit. In alternative examples, server 106 may determine an optimum station from the plurality of candidate stations (for example one with a minimum cost, or with the largest incentive) and send station information only for this optimum station to the client 102 in step 590. As previously described with reference to FIG. 5A, client 102 may in examples, identify an optimum station amongst the list of candidate stations via a display device 124a-n of the client using any suitable textual or graphical representation.

User 190 may then journey to the selected station and may be configured to send client location information 372 at periodic intervals to the server during the journey. At step 593 server 106 may determine, based on receipt of one such piece of uploaded client location information (shown in FIG. 5B as message 587b), that the client has arrived at a known station. In some examples, the arrival of the client at a station may trigger payment of an incentive or rebate (such as may have been previously offered to the user via its inclusion within station information 590) to the user, to a transportation company or to an operator company. In examples, the payment may be made into a digital wallet or into another account of the user. The payment may be made in any of; a national currency, a cryptocurrency, a token, a coupon or a voucher. When made in the form of a token, coupon or voucher, the payment may be redeemable by its recipient against only certain related goods and services. For example, the payment may be redeemable against food at any disposal station owned or operated by the same disposal company, or against workwear clothing merchandise of a related or affiliated supplier. In further examples, the currency of payment may also be earned by users and paid into the digital wallet or account in return for other user or client actions, such as for leaving station feedback via the client application, or for responding to client information requests 530 sent by the server 106.

In further examples, a location of the client being recorded at or near a known station may not, by itself, be sufficient to verify that the user has actually used the services of the station, and hence the system may need to collect additional validation information before payment of an incentive or a rebate is made. In some examples, the additional validation information may comprise a record of a related electronic or paper invoice or receipt, a confirmation of the user's visit by a member of staff at the station, or a verification using flow sensors on the truck that show a volume of water offloaded at the station. In examples, user 190 may use client application 430 to upload the additional validation information to server 106, optionally in response to a request from the server to do so. In other examples, server 106 may communicate with servers of other commercial entities (such as transportation companies, operating companies or disposal companies) in order to obtain the additional validation information necessary to trigger payment of the incentive or rebate.

The above systems, devices, methods, processes, and the like may be realized in hardware, software, or any suitable combination of these. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in several ways. At the same time, processing may be distributed across devices such as the various systems described above, or all the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A system for determining station information regarding a substance transfer station for vehicular loading or unloading of a carried substance, the system comprising:
    a flow rate sensor associated with a pipeline input and configured to measure a first amount of substance received at the substance transfer station from the pipeline input;
    a first client device including a location transceiver coupled to a location antenna, the first client device being associated with a first substance transportation vehicle and configured to track a location of the first substance transportation vehicle in a vicinity of the substance transfer station;
    a server including at least one memory unit configured to store instructions; and
    at least one processor configured to execute the instructions to: receive first location information obtained by the location transceiver of the first client device,
    determine, based on the first location information, an arrival time of the first client device within a predefined region surrounding at least a portion of the substance transfer station;
    receive second location information obtained by the location transceiver of the first client device associated with the first substance transportation vehicle;
    determine based on the second location information a departure time of the first client device from the predefined region surrounding at least a portion of the substance transfer station;
    measure a station time, the station time being based on a difference between the arrival time and the departure time of the first substance transfer vehicle;
    control the flow rate sensor to measure the first amount of substance received at the substance transfer station from the pipeline input;
    determine an estimated second amount of substance unloaded from the first substance transportation vehicle according to the station time;
    determine an estimated remaining capacity of the substance transfer station according to at least the first amount of substance and the second amount of substance;
    determine an incentive according to the estimated remaining capacity; and
    transmit the station information to a second client device, wherein the station information includes the incentive, the estimated remaining capacity, and a total time estimate associated with journeying to the substance transfer station by a second substance transportation vehicle, waiting at the substance transfer station, and transferring of a carried substance from the second substance transportation vehicle at the substance transfer station, wherein the total time estimate is based at least on a current location of the second substance transportation vehicle and the station time.

2. The system of claim 1, wherein the server is further configured for determining an estimated time until maximum capacity of the substance transfer station is reached.

3. The system of claim 1, wherein the server is further configured for determining an estimated waiting time at the at least one substance transfer station based on tracking the location of the substance transportation vehicle.

4. The system of claim 3, further comprising:
    a second location transceiver associated with the second substance transportation vehicle;
    wherein the server is further configured for:
    tracking, by the second location transceiver, a second location of the second substance transportation vehicle,
    determining the total time estimate for disposal including a journey time, an offload time, and the estimated waiting time for the second substance transportation vehicle, and
    transmitting the total time to the second client device associated with the second substance transportation vehicle.

5. The system of claim 1 further comprising a pressure sensor configured to measure downhole pressure, wherein the server is further configured for determining the estimated remaining capacity by measuring the downhole pressure with the pressure sensor.

6. The system of claim 1, further comprising a flow sensor associated with the first substance transportation vehicle, wherein the server is further configured for estimating the second amount of substance unloaded from the first substance transportation vehicle to the substance transfer station by measuring a flow of substance from the at least one substance transportation vehicle by the flow sensor.

7. The system of claim 1, wherein the server is further configured for determining the estimated remaining capacity by comparing the first amount of substance and the second amount of substance to a daily limit of the substance transfer station.

8. The system of claim 1, wherein the server is further configured for determining the estimated remaining capacity further by adjusting a total capacity according to seismic activity measurements.

9. The system of claim 1, wherein the server is further configured for determining the estimated remaining capacity by adjusting a total capacity according to prescribed regulatory limits.

10. The system of claim 1, wherein the server is further configured for determining the estimated remaining capacity by determining a first estimated remaining capacity for pipeline delivered substance and a second estimated remaining capacity for vehicle delivered substance.

11. The system of claim 1, wherein the server is further configured for:
- determining a plurality of estimated remaining capacities of a plurality of substance transfer stations;
- determining a plurality of locations of the plurality of substance transfer stations;
- determining a plurality of waiting times of the plurality of substance transfer stations;
- determining a preferred substance transfer station according to the plurality of estimated remaining capacities, the plurality of locations, and the plurality of waiting times.

* * * * *